US008315876B2

(12) United States Patent
Reuss

(10) Patent No.: US 8,315,876 B2
(45) Date of Patent: Nov. 20, 2012

(54) HEADSET WEARER IDENTITY AUTHENTICATION WITH VOICE PRINT OR SPEECH RECOGNITION

(75) Inventor: Edward Lester Reuss, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 1218 days.

(21) Appl. No.: 12/118,627

(22) Filed: May 9, 2008

(65) Prior Publication Data

US 2009/0281809 A1 Nov. 12, 2009

(51) Int. Cl.
  *G10L 15/02* (2006.01)
  *G10L 15/06* (2006.01)
  *G10L 21/00* (2006.01)
  G10L 15/00 (2006.01)
  G06F 19/00 (2011.01)

(52) U.S. Cl. ........ 704/273; 704/231; 704/243; 704/275; 700/175

(58) Field of Classification Search .......... 704/231–257, 704/270–275, E17.001–E17.016, E15.001–E15.05, 704/E11.001–E11.007; 700/90–91, 174–175
See application file for complete search history.

(56) References Cited

U.S. PATENT DOCUMENTS

| | | | | |
|---|---|---|---|---|
| 5,586,171 A * | 12/1996 | McAllister et al. | ........ | 379/88.02 |
| 5,907,802 A * | 5/1999 | Scott | .............. | 455/406 |
| 5,991,645 A * | 11/1999 | Yuen et al. | ................. | 455/575.2 |
| 6,594,632 B1 * | 7/2003 | White | ............................ | 704/270 |
| 6,774,796 B2 * | 8/2004 | Smith | ........................ | 340/573.1 |
| 6,941,161 B1 * | 9/2005 | Bobisuthi et al. | .......... | 455/569.1 |
| 6,965,669 B2 * | 11/2005 | Bickford et al. | ......... | 379/265.07 |
| 7,054,819 B1 * | 5/2006 | Loveland | ...................... | 704/273 |
| 7,200,560 B2 * | 4/2007 | Philbert | ........................ | 704/271 |
| 7,248,881 B2 * | 7/2007 | Shostak | ...................... | 455/456.1 |
| 7,254,708 B2 * | 8/2007 | Silvester | ...................... | 713/170 |
| 7,280,849 B1 * | 10/2007 | Bailey | ............................ | 455/563 |
| 7,321,774 B1 * | 1/2008 | Lau et al. | ................... | 455/456.1 |
| 7,440,746 B1 * | 10/2008 | Swan | ......................... | 455/412.1 |
| 7,496,693 B2 * | 2/2009 | Cook et al. | ...................... | 710/10 |
| 7,555,110 B2 * | 6/2009 | Dolan et al. | ............. | 379/211.02 |
| 7,593,605 B2 * | 9/2009 | King et al. | .................... | 382/313 |
| 7,631,811 B1 * | 12/2009 | Brown | ......................... | 235/454 |

(Continued)

FOREIGN PATENT DOCUMENTS

WO 2007103041 9/2007

(Continued)

OTHER PUBLICATIONS

European Patent Office. International Search Report: PCT/US2009/034903. May 2009. Rijswijk, Netherlands.

(Continued)

*Primary Examiner* — Pierre-Louis Desir
*Assistant Examiner* — David Kovacek
(74) *Attorney, Agent, or Firm* — Chuang Intellectual Property Law

(57) ABSTRACT

A headset includes a voice print match application or speech recognition application. The voice print match application receives a user speech corresponding to a submitted voice print phrase key upon determining a donned condition, where the user speech is compared to the predetermined voice print phrase key to validate an identity of the headset user. The speech recognition application receives a user speech corresponding to a password or PIN and recognizes the password or PIN. The recognized password or PIN is compared to a valid password or PIN to validate the identity of the headset user.

36 Claims, 22 Drawing Sheets

U.S. PATENT DOCUMENTS

| | | | | |
|---|---|---|---|---|
| 7,640,160 B2* | 12/2009 | Di Cristo et al. | | 704/257 |
| 7,707,035 B2* | 4/2010 | McCune | | 704/270 |
| 7,882,032 B1* | 2/2011 | Hoffman | | 705/50 |
| 7,983,918 B2* | 7/2011 | Cizio | | 704/258 |
| 2003/0023435 A1* | 1/2003 | Josephson | | 704/235 |
| 2003/0025603 A1* | 2/2003 | Smith | | 340/572.8 |
| 2003/0073434 A1* | 4/2003 | Shostak | | 455/426 |
| 2003/0130016 A1* | 7/2003 | Matsuura et al. | | 455/569 |
| 2003/0130771 A1* | 7/2003 | Crank | | 701/4 |
| 2003/0140030 A1* | 7/2003 | Birkhoelzer et al. | | 707/1 |
| 2003/0164398 A1* | 9/2003 | Walker et al. | | 235/375 |
| 2003/0165230 A1* | 9/2003 | Reuss | | 379/265.02 |
| 2003/0172271 A1* | 9/2003 | Silvester | | 713/170 |
| 2003/0191609 A1* | 10/2003 | Bernardi et al. | | 702/191 |
| 2004/0058647 A1* | 3/2004 | Zhang et al. | | 455/41.2 |
| 2004/0107108 A1* | 6/2004 | Rohwer | | 704/275 |
| 2004/0174249 A1* | 9/2004 | Kusubashi | | 340/7.4 |
| 2005/0200632 A1* | 9/2005 | Davis | | 345/601 |
| 2005/0203912 A1* | 9/2005 | Beach et al. | | 707/10 |
| 2005/0288930 A1* | 12/2005 | Shaw et al. | | 704/257 |
| 2006/0025206 A1* | 2/2006 | Walker et al. | | 463/20 |
| 2006/0079291 A1* | 4/2006 | Granovetter et al. | | 455/563 |
| 2006/0093998 A1* | 5/2006 | Vertegaal | | 434/236 |
| 2006/0135214 A1* | 6/2006 | Zhang et al. | | 455/569.1 |
| 2006/0166718 A1* | 7/2006 | Seshadri et al. | | 455/575.2 |
| 2006/0167687 A1* | 7/2006 | Kates | | 704/235 |
| 2006/0267860 A1* | 11/2006 | Rinaldo et al. | | 345/1.2 |
| 2007/0003061 A1* | 1/2007 | Jung et al. | | 380/270 |
| 2007/0053513 A1* | 3/2007 | Hoffberg | | 380/201 |
| 2007/0083470 A1* | 4/2007 | Bonner et al. | | 705/51 |
| 2007/0155418 A1* | 7/2007 | Shau et al. | | 455/550.1 |
| 2007/0207767 A1* | 9/2007 | Reuss | | 455/403 |
| 2007/0297618 A1* | 12/2007 | Nurmi et al. | | 381/71.6 |
| 2008/0075065 A1* | 3/2008 | Reuss et al. | | 370/352 |
| 2008/0080705 A1* | 4/2008 | Gerhardt et al. | | 379/430 |
| 2008/0082339 A1* | 4/2008 | Li et al. | | 704/275 |
| 2008/0112567 A1* | 5/2008 | Siegel et al. | | 381/58 |
| 2008/0130936 A1* | 6/2008 | Lau et al. | | 381/370 |
| 2008/0132220 A1* | 6/2008 | Fitzgibbon | | 455/420 |
| 2008/0274696 A1* | 11/2008 | Bakshi et al. | | 455/41.2 |
| 2008/0299948 A1* | 12/2008 | Rosener | | 455/412.2 |
| 2009/0009588 A1* | 1/2009 | Shaffer et al. | | 348/14.08 |
| 2009/0041313 A1* | 2/2009 | Brown | | 382/124 |
| 2009/0049307 A1* | 2/2009 | Lin | | 713/185 |
| 2009/0061819 A1* | 3/2009 | Coughlan et al. | | 455/410 |
| 2009/0082071 A1* | 3/2009 | Hicks, III | | 455/570 |
| 2009/0249478 A1* | 10/2009 | Rosener et al. | | 726/19 |
| 2009/0274317 A1* | 11/2009 | Kahn et al. | | 381/74 |
| 2009/0281809 A1* | 11/2009 | Reuss | | 704/273 |

FOREIGN PATENT DOCUMENTS

| | | |
|---|---|---|
| WO | 2008008101 | 1/2008 |
| WO | 2008045180 | 4/2008 |

OTHER PUBLICATIONS

European Patent Office. Written Opinion of the International Searching Authority: PCT/US2009/034903. May 2009. Germany, Munich.

* cited by examiner

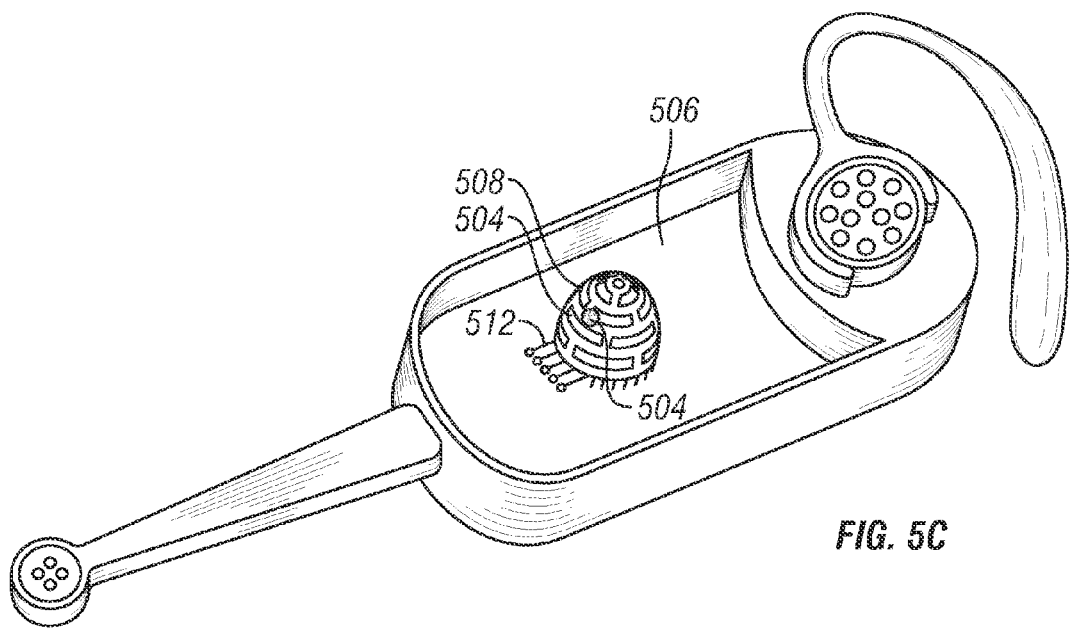
*FIG. 5C*
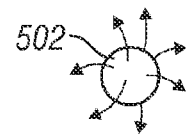
*FIG. 5C1*
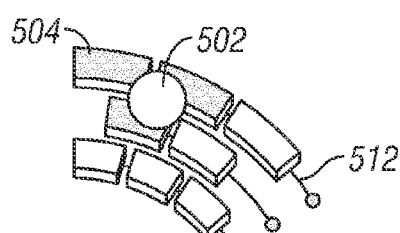
*FIG. 5C2*
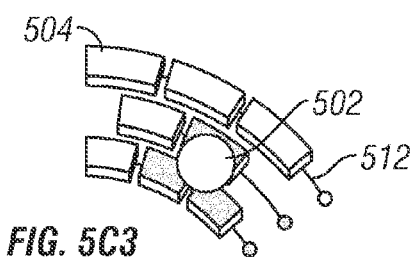
*FIG. 5C3*

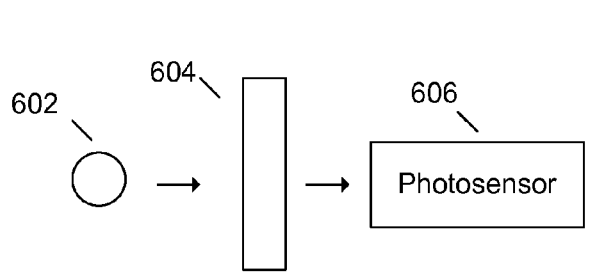
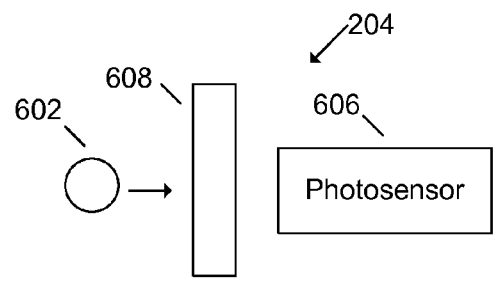
FIG. 6A    FIG. 6B
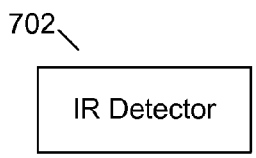
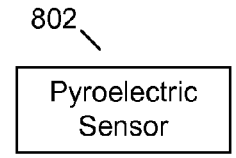
FIG. 7    FIG. 8A
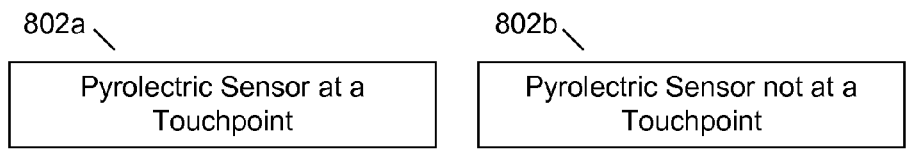
FIG. 8B
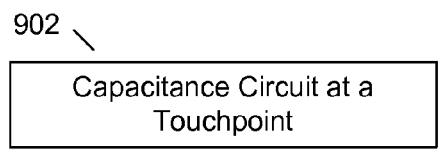
FIG. 9

1522

| Name/ID | Voice Print Phrase Key | Password/PIN |
|---------|------------------------|--------------|
| Name1 | Name1 Voice Print Phrase Key | Name1 password |
| Name2 | Name2 Voice Print Phrase Key | Name2 password |
| | | |

| Name/ID | Voice Print Phrase Key |
|---------|------------------------|
| Name1   | Name1 Voice Print Phrase Key |
| Name2   | Name2 Voice Print Phrase Key |
|         |                        |

| Name/ID | Password/PIN |
|---------|--------------|
| Name1   | Name1 password |
| Name2   | Name2 password |
|         |              |

FIG. 16C

HEADSET WEARER IDENTITY AUTHENTICATION WITH VOICE PRINT OR SPEECH RECOGNITION

CROSS-REFERENCE TO RELATED APPLICATIONS

This application is related to pending patent application Ser. No. 11/891,370 for "User Validation of Body Worn Device" filed on Aug. 10, 2007, the entire disclosure of which is incorporated herein by reference for all purposes.

BACKGROUND OF THE INVENTION

As headsets become more "intelligent", offering advanced features and functionality, they store and utilize increased quantities of user specific information. Such user specific information includes listening preferences such as volume, tone, and audio equalization. User specific information also includes, for example, passwords, telephone directories, and network or device identities to communicate with.

In the prior art, there was limited need for headset user validation since the scope of features and functionality was limited. However, with the recent advent of more advanced headsets, if the headset does not authenticate that the person who wears the headset is indeed the authorized user to which this information pertains, then the person wearing the headset may be able to gain access to user specific information without the authorized user's permission or knowledge. This unauthorized access is particularly dangerous where an intelligent headset may permit an unauthorized wearer to gain access to the valid owner's e-mail, contact lists, voice mail, or other private information. Unauthorized access may also occur where the user is validated, but then removes the headset and the headset is then used by an unauthorized user.

As a result, there is a need for improved methods and apparatuses for headset usage and user validation.

BRIEF DESCRIPTION OF THE DRAWINGS

The present invention will be readily understood by the following detailed description in conjunction with the accompanying drawings, wherein like reference numerals designate like structural elements.

FIGS. 3 through 6 show different embodiments of a motion detector used in a headset.

FIGS. 7 through 13 show different embodiments of a non-motion detector used in a headset.

FIGS. 16A-16C illustrate example configurations of a database stored at the headset shown in FIG. 15.

DESCRIPTION OF SPECIFIC EMBODIMENTS

Figure 1:
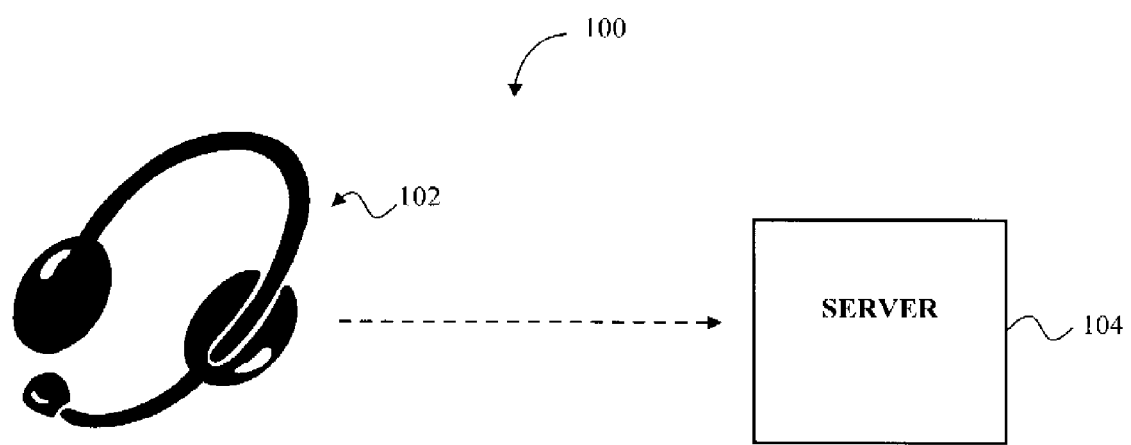
FIG. 1 shows a system including a headset server and a headset (wired or wireless) capable of indicating a donned or doffed state.

Methods and apparatuses for headset user validation are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to material that is known in the technical fields related to the invention have not been described in detail so as not to unnecessarily obscure the present invention.

This invention relates generally to the field of intelligent headsets and specifically to the field of headsets that contain or allow access to user-specific information. In one example, this description describes a method and apparatus for a headset with user validation (also referred to herein as user authentication). In one example, the user validation process is activated upon detection of a particular headset usage status, such as when the headset state shifts from a not worn (doffed) state to a worn state (donned or also referred to herein as "DON"). The headset includes a detector for determining whether the headset is donned or doffed, and when the headset shifts from being doffed to donned or vice versa.

User validation is accomplished using either voice print matching (also referred to herein as voice print identification) or speech recognition of a password or PIN. In one example, the validation process begins automatically when a donned/doffed detector in the headset determines that the headset has been donned. In one example, the user is prompted with an audible prompt pre-stored in headset memory. In a further example, whenever the user puts the headset on their ear and starts to use it, they must signal to the headset that they wish to become authorized to use it. They may do this either by pressing a user interface special button, or pressing an existing button, or combination of buttons, in a particular way.

Using text to speech conversion or a pre-stored audio prompt, the headset prompts the user via the headset speaker to speak a phrase into the headset. There are two methods that can be used to authenticate the wearer's identity via audio prompts.

In one example, the spoken phrase is a fixed predetermined passphrase (also referred to herein as a "password" or "personal identification number (PIN)" that only the headset and the user know. This passphrase is then recorded by the microphone, converted using an A/D converter, and fed into a speech recognition (also sometimes referred to in the art as "voice recognition") application to verify the correct phrase was spoken. Any speech recognition application/engine known in the art may be used. For example, the digitized voice samples are divided into frames of a pre-determined length. The energy of each frame is calculated and used to identify the start and end of a spoken word. Linear prediction coding may be used to produce parameters of the spoken word, and recognition features of the word are calculated and matched with reference words in a reference library.

In a second example, voice print identification is used. A voice print match (also referred to herein as "speaker recognition") is highly accurate and identifies an individual based upon the use of a predetermined user provided identifying phrase (herein also referred to as the "voice print phrase key"). The voice print match may operate by matching the test voice print phrase key against a template of the authorized user's voice characteristics, such as spectral matching, cadence, etc. In one example, the user initially inputs a predetermined voice print phrase key or keys into the voice print identification system for use as the benchmark against which all future user accesses are compared. Each time the user wishes to use the headset that is protected by the voice print identification system, the user must speak the predetermined voice print phrase key for comparison with the stored phrase. The user response must come within an acceptable range of similarity with the pre-stored voice print phrase key. In an example where a headset may be used by multiple users, the user first speaks or enters his or her name or other identification, and the headset uses the received name or identification to identify the pre-stored voice print phrase key which is used to validate the user. The user is prompted with audio prompts to speak his or her name. In one example, the spoken name or identification is converted to ASCII using voice recognition or other speech-to-text conversion applications. In a further example, the headset prompts the wearer using audio prompts to repeat one or a few of a large corpus of predefined phrases or sentences. The headset then records the spoken phrases and feeds them into the aforementioned speaker recognition application to verify the wearer's identity. For reliable speaker recognition on untrained phrases, several phrases may be required. Both the speech recognition system and the speaker recognition system may be embedded inside the headset itself, or potentially located in a remote location to which the headset sets up a temporary connection for authentication purposes.

The methods and systems described herein offer several advantages. For example, the methods and systems ensure that no one can gain unauthorized access to the user's private information. They also ensure that an unsuspecting person won't suffer damage to their ear due to an overly loud headset volume setting. Voice print or speaker recognition validation techniques are particularly useful for headsets, as headsets already have a microphone for receiving speech and audio processing capabilities. As a result, additional hardware is not required to implement voice print or speaker recognition user authentication. Where the headset is used for presence applications (such as determining whether the use is available or willing to be contacted), validation of the headset user increases reliability of the presence information.

In one example, a headset includes a detector providing an output indicating a donned or doffed condition, a memory storing a pre-determined voice print phrase key of an authorized headset user, a microphone, and a processor. The headset includes a voice print match application for receiving a user speech corresponding to a submitted voice print phrase key upon determining a donned condition and prompting the authorized headset user with a pre-stored audio prompt to speak a voice print phrase key, where the user speech is compared to the pre-determined voice print phrase key to validate an identity of the authorized headset user.

In one example, a headset includes a detector providing an output indicating a donned or doffed condition, a memory storing a valid password or PIN of an authorized headset user, a microphone, and a processor. The headset includes a speech recognition application for receiving a user speech corresponding to a password or PIN upon determining a donned condition and prompting the authorized headset user with a pre-stored audio prompt to speak a password or personal identification number, where a submitted password or PIN recognized from the user speech is compared to the valid password or PIN to validate an identity of the authorized headset user.

In one example, a method for validating the identity of a headset wearer includes detecting kinetic energy, temperature or capacitance to determine a headset characteristic, and processing the headset characteristic to determine a donned condition or a doffed condition. A spoken user voice print phrase key is received upon detection of the donned condition. The spoken user voice print phrase key is compared to a stored authorized user voice print phrase key to validate an identity of a headset wearer.

In one example, a method for validating the identity of a headset wearer includes detecting kinetic energy, temperature or capacitance to determine a headset characteristic, and processing the headset characteristic to determine a donned or doffed condition. The method further includes receiving user speech including a password or personal identification number upon detection of a donned condition, and recognizing the password or personal identification number. The password or personal identification number is compared to a stored authorized user password or personal identification number to validate an identity of a headset wearer. The method further includes terminating validation upon detection of a doffed condition.

In one example, headset user validation system includes a headset and an authenticator device. The headset includes a detector providing an output indicating a donned condition or a doffed condition, a microphone for receiving a user speech, a speaker, and a memory storing audio prompts for output through the speaker to prompt a user to speak a voice print phrase key. The authenticator device includes a memory storing a pre-determined voice print phrase key of an authorized headset user and a processor. The authenticator device further includes a voice print match application for receiving the user speech corresponding to a submitted voice print phrase key upon receiving notification of the donned condition, where the user speech is compared to the pre-determined voice print phrase key to validate an identity of the authorized headset user.

In one example, a headset user validation system includes a headset and an authenticator device. The headset includes a detector providing an output indicating a donned condition or a doffed condition and a microphone for receiving a user speech corresponding to a password or personal identification number. The headset further includes a speaker for outputting an audible prompt to prompt a user to submit user speech corresponding to a password or personal identification number. The authenticator device includes a memory storing a valid password or personal identification number of an authorized headset user, and a processor. The authenticator device further includes a speech recognition application for receiving the user speech corresponding to a password or personal identification number upon determining a donned condition, where a submitted password or personal identification number recognized from the user speech is compared to the valid password or personal identification number to validate an identity of the authorized headset user.

In one example, a method for validating the identity of a headset wearer includes detecting kinetic energy, temperature or capacitance to determine a headset characteristic, and processing the headset characteristic to determine a donned condition or a doffed condition. The method further includes receiving a spoken user voice print phrase key upon detection of a donned condition, and transmitting the spoken user voice print phrase key to a remote authentication device. The spoken user voice print phrase key is compared to a stored authorized user voice print phrase key at the remote authentication device to validate an identity of a headset wearer.

In one example, a method for validating the identity of a headset wearer includes detecting kinetic energy, temperature or capacitance to determine a headset characteristic, and processing the headset characteristic to determine a donned or doffed condition. The method further includes receiving a user speech includes a password or personal identification number, transmitting the user speech to a remote authentication device, and recognizing the password or personal identification number at the remote authentication device. The password or personal identification number is compared to a stored authorized user password or personal identification number to validate an identity of a headset wearer.

Referring now to FIG. 1, a system 100 includes a headset 102 and a headset server 104 operably coupled together. Other elements may be between headset 102 and server 104, such as but not limited to, adaptors, access points, and/or networks. It is noted that server 104 may be used to route calls to multiple headsets, for example, at a call center.

Headset 102 may be wired or wireless. In one example, headset 102 may be wired to an adaptor which is coupled to a network, or headset 102 may be wirelessly coupled to an access point (AP) (not shown), which is operably coupled with a network. In one example, the network may be a communications network which may include a public switched telephone network (PSTN), an integrated services digital network (ISDN), a local area network (LAN), and/or a wireless local area network (WLAN), that support standards such as Ethernet, wireless fidelity (Wi-Fi), and/or voice over internet protocol (VoIP).

In one example, an AP includes a transceiver and a processor configured to allow a wireless device (e.g., a headset) access to a network connected to the access point (e.g., via a 10/100base-T Ethernet RJ-45 port). An AP may be any device that allows wireless-equipped computers and other devices to communicate with a wired network. In one example, an AP is able to support Wi-Fi in general, and the 802.11a, 802.11b, and/or 802.11g wireless networking standards in particular. In other examples, the AP may be able to support other wireless networking standards.

Figure 2:
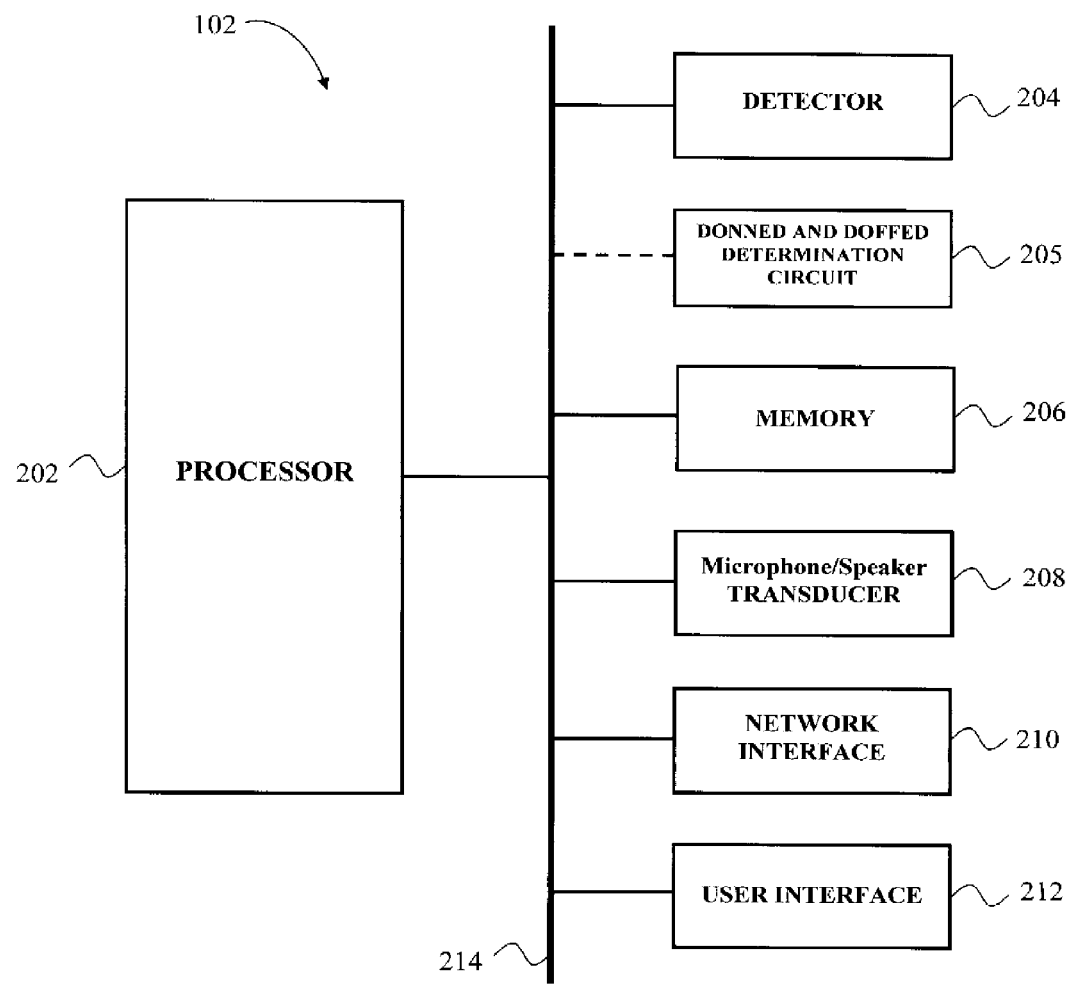
FIG. 2 shows a block diagram of a headset capable of indicating a donned or doffed state.

Referring now to FIG. 2 in conjunction with FIG. 1, a block diagram of an example of headset 102 is shown. Headset 102 includes a processor 202 operably coupled via a bus 214 to a detector 204, a donned and doffed determination circuit 205, a memory 206, a transducer 208, an optional network interface 210, and an optional user interface 212.

Processor 202 allows for processing data, in particular managing data between detector 204, determination circuit 205, and memory 206 for determining the donned or doffed state of headset 102. In one example, processor 202 may also process information about access points, service providers, and service accounts for wireless headsets. In one example, processor 202 is a high performance, highly integrated, and highly flexible system-on-chip (SoC), including signal processing functionality such as echo cancellation/reduction and gain control in another example. Processor 202 may include a variety of processors (e.g., digital signal processors), with conventional CPUs being applicable.

Detector 204 includes a motion detector and/or a non-motion detector providing output charges based upon a headset characteristic such as kinetic energy, temperature, and/or capacitance.

In the case of a motion detector, as the user wears the headset, subtle movements of the head (e.g., from standing, sitting, walking, or running) cause movements of the headset, and detector 204 transfers kinetic energy from head and body movement into an electromotive force, or an output charge. In other words, motion of the headset induces a small fluctuating current flow in a nearby electrical conductor. Current in this conductor is amplified electronically. The output charges may be provided at predetermined or varying intervals (e.g., sampling every 5 seconds) and for predetermined or varying periods (e.g., based on time or number of samples) to form an output charge pattern.

Detector 204 is operably coupled to a determination circuit 205 for determining whether a plurality of the output charges form an output charge pattern corresponding to a state selected from the group consisting of the headset being donned and doffed. In one example, determination circuit 205 compares the output charge pattern to a predetermined profile, and if the pattern is within the bounds of the predetermined profile, the headset is considered to be in a state of being donned. When there is no recognized output charge pattern for a predetermined period, then the headset may be considered to be abandoned and in a state of being doffed. In another embodiment, the output charge pattern may be recognized as a doffed output charge pattern. The output charges may be shaped using a comparator circuit which is connected to an input pin on a general purpose microcontroller. Firmware in the microcontroller may implement a filtering algorithm to discriminate between movement of a headset when doffed and the occasional movements caused by relocating a non-worn headset from one location to another. In this example, determination circuit 205 is an individual component operably coupled to other components of headset 102 via bus 214, but determination circuit 205 may be placed in various places as shown by the dashed line connection, for example being integrated with processor 202 or detector 204, stored in memory 206, or being provided from outside of headset 102, for example at server 104.

In the case of a non-motion detector, as the user wears the headset, detector 204 transfers temperature and/or capacitance readings into an electromotive force, or an output charge. Current in this conductor is amplified electronically and processed as described above with respect to motion detectors. Again, the output charges may be provided at predetermined or varying intervals and for predetermined or varying periods to form an output charge pattern.

Memory 206 may include a variety of memories, and in one example includes SDRAM, ROM, flash memory, or a combination thereof. Memory 206 may further include separate memory structures or a single integrated memory structure. In one example, memory 206 may be used to store passwords, network and telecommunications programs, and/or an operating system (OS). In one embodiment, memory 206 may store determination circuit 205, output charges and patterns thereof from detector 204, and predetermined output charge profiles for comparison to determine the donned and doffed state of a headset.

Transducer 208 may include an acoustic transducer, such as a microphone, a speaker, or a combination thereof, for transmission of sound (such as from the user's mouth or to the user's ear based upon signals from an audio source). Transducer 208 may also include a plurality of separate transducers for performing different functions. The transducer can be any type of electromagnetic, piezoelectric, or electrostatic type of driving element, or a combination thereof, or another form of driving element, for generating sound waves from the output face of the transducer. In one embodiment, the transducer may receive signals through wireless communication channels, such as by Bluetooth® protocols and hardware, in one example.

Network interface 210 allows for communication with APs, and in one example includes a transceiver for communicating with a wireless local area network (LAN) radio transceiver (e.g., wireless fidelity (Wi-Fi), Bluetooth, ultra wideband (UWB) radio, etc.) for access to a network (e.g., a wireless LAN or the Internet), or an adaptor for providing wired communications to a network. In one example, network interface 210 is adapted to derive a network address for the headset using the headset's electronic serial number, which is used to identify the headset on the network. In one embodiment, the electronic serial number may be the headset's Media Access Control (MAC) address; however, the electronic serial number may be any number that is mappable to a network address. Network interface 210 is adapted to communicate over the network using the network address that it derives for the headset. In one embodiment, network interface 210 is able to transmit and receive digital and/or analog signals, and in one example communicates over the network using IP, wherein the network interface uses a unique address, which is either manually configured or assigned using an automatic method such as the well-known DHCP, as its IP address. In particular, network interface 210 may be operably coupled to a network via the IEEE 802.11 protocol. However, the network interface 210 may communicate using any of various protocols known in the art for wireless or wired connectivity.

An example of an applicable network interface and the Internet Protocol layers (and other protocols) of interest are described in pending U.S. patent application Ser. No. 10/091,905 filed Mar. 4, 2002, the full disclosure of which is hereby incorporated by reference for all purposes.

User interface 212 allows for manual communication between the headset user and the headset, and in one example includes an audio and/or visual interface such that a prompt may be provided to the user's ear and/or an LED may be lit.

Referring now to FIGS. 3 through 13, different embodiments of detector 204 are described. FIGS. 3 through 6 illustrate examples of motion detectors, and FIGS. 7 through 13 illustrate examples of non-motion.

Figure 3A:
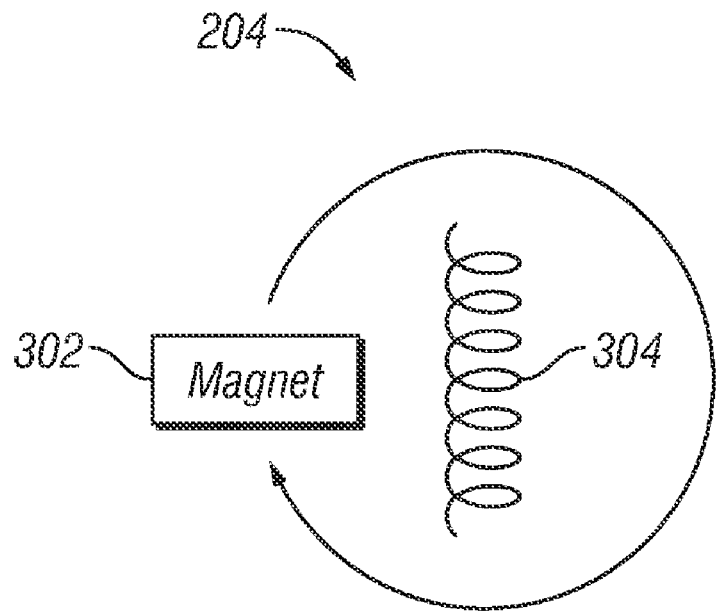
Figure 3B:
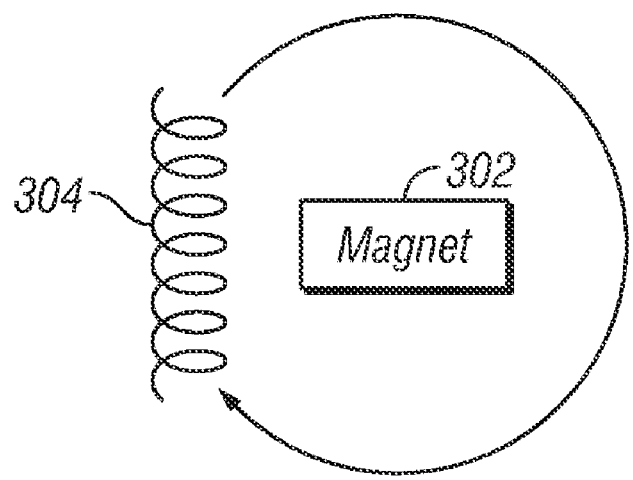

FIGS. 3A and 3B illustrate a magnet 302 and a conductor 304, such as a coil, that move relative to one another such that an output charge is generated in accordance with an embodiment. FIG. 3A illustrates a movable magnet 302 that moves relative to a fixed conductor 304, and FIG. 3B illustrates a movable conductor 304 that moves relative to a fixed magnet 302. The movable component may be hinged, suspended mechanically, or otherwise movably coupled so that gravity or inertia drives slight movement with respect to the headset whenever the headset wearer moves his head or body. In one example, the fixed magnet may be the same magnet used in a moving-coil transducer contained in the headset. The induced current in the conductive element is amplified, sent to a donned and doffed determination circuit (for example a part of a printed circuit board assembly), and processed as described above to determine a state of the headset.

Figure 3C:
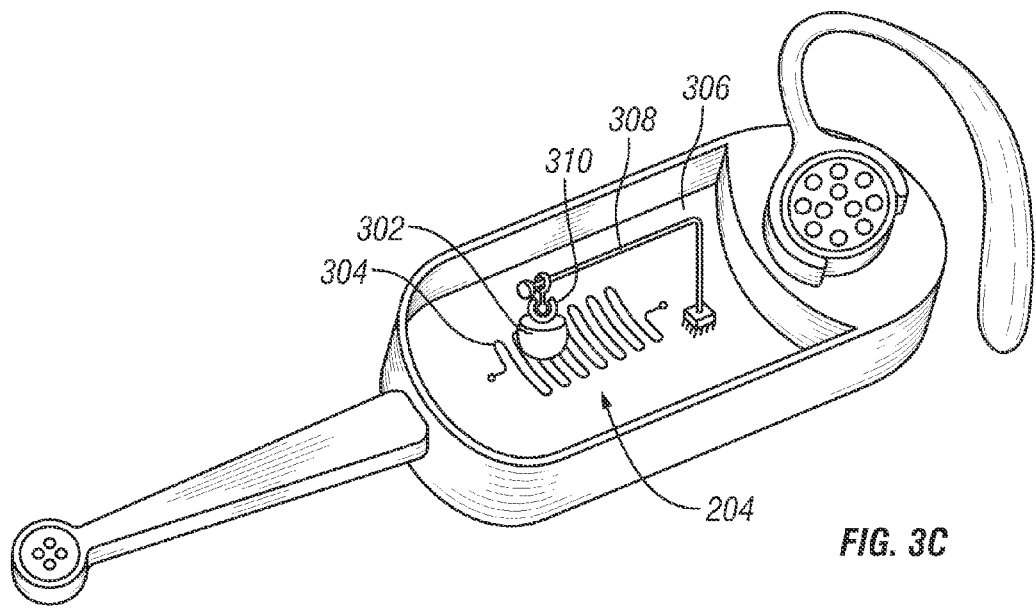
Figure 3D:
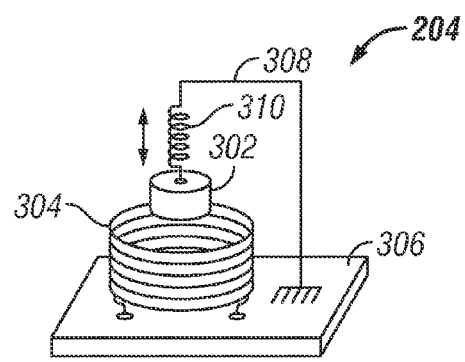
Figure 3E:
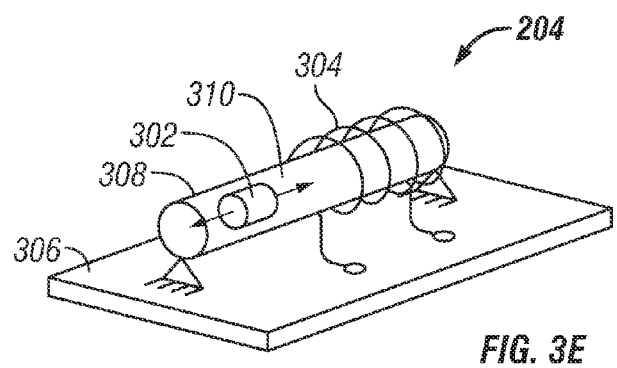

FIGS. 3C through 3E illustrate in more detail embodiments of magnet 302 movable with respect to a fixed conductor 304. FIGS. 3C, 3D, and 3E show a movable magnet 302 and a fixed conductor 304, which is operably coupled to a printed circuit board assembly (PCBA) 306.

In FIGS. 3C and 3D, magnet 302 is movably coupled to magnet support 308 via a joint 310, which allows magnet 302 to move in various directions relative to conductor 304. In FIG. 3C, joint 310 may include a ball-and-socket type joint slidably coupled along support 308 allowing magnet 302 to move over trace conductor 304. In FIG. 3D, joint 310 may include a spring that allows magnet 302 to move along an interior of coil conductor 304. In FIG. 3E, magnet 302 is movable within support 308, which is filled with a fluid 310, in one example a ferrofluid, allowing magnet 302 to move along an interior of coil conductor 304 that surrounds at least a portion of support 308.

Figure 3F:
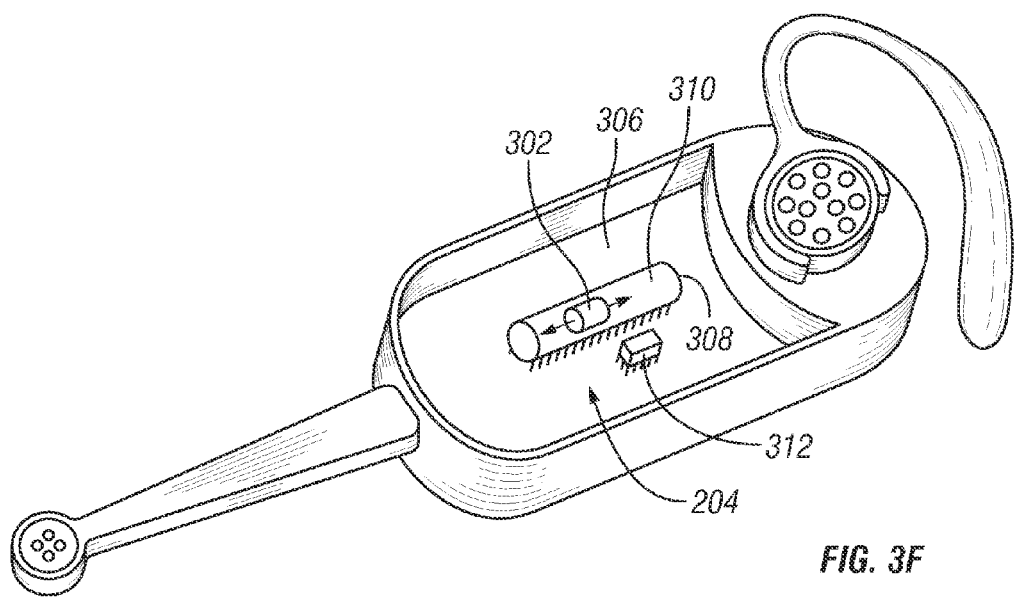

FIG. 3F shows a similar detector as in FIG. 3E, including magnet 302, PCBA 306, support 308, and fluid 310, but instead of conductor 304, a sensor 312 is positioned proximate to support 308 for sensing movement of magnet 302 (e.g., sensing if the magnet passes the sensor). In one example, with no intent to limit the invention thereby, sensor 312 may include a Hall Effect sensor, a reed switch, and/or an optical switch.

Figure 4A:
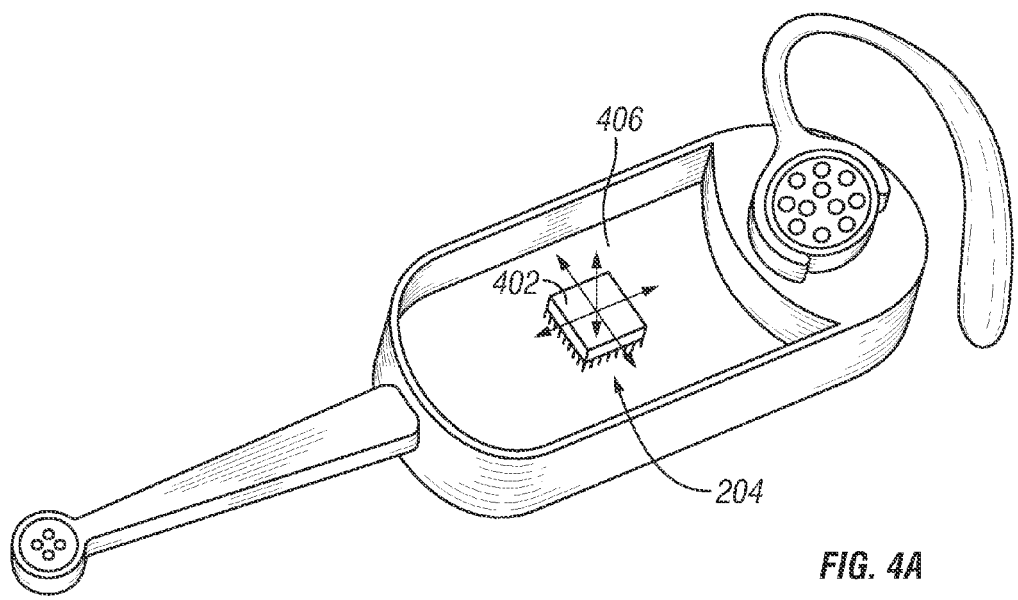

FIG. 4A illustrates an acceleration sensor 402 operably coupled to a PCBA 406 in accordance with an embodiment. In one example, acceleration sensor 402 includes a mass affixed to a piezoelectric crystal. The mass is coupled to a supporting base through the piezoelectric crystal. When the sensor is subjected to kinetic activity, the sensor experiences force due to the acceleration of the mass, thereby exerting a force on the crystal. This force results in an output charge of the crystal that is directly proportional to the input acceleration. The variations in force against the crystal resulting from the movements of the headset result in various output charges. The output charge is amplified, sent to a donned and doffed determination circuit, and processed as described above to determine a state of the headset.

Examples of applicable micro-electronic mechanical acceleration sensors, such as piezoelectric accelerometers, are dual and tri-axis accelerometers model series KXM and KXP, available from Kionix, Inc. of Ithaca, N.Y. Various piezoelectric crystal materials may be used for the accelerometer construction, such as ceramic lead metaniobate, lead zirconate, lead titanate, and natural quartz crystal. Various mechanical configurations of the masses and crystals may also be used, including but not limited to isolated compression, shear, and ring shear, to name a few.

Figure 4B:
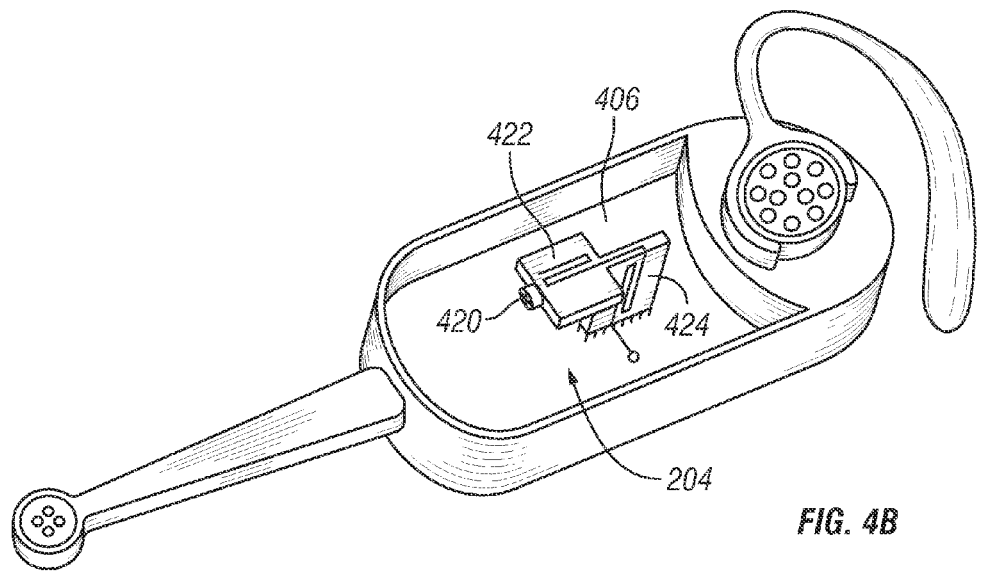

In another embodiment, acceleration sensor 402 may include strain gauges in one or more axes of the headset, as illustrated in FIGS. 4B, 4B1, and 4B2. In one example, detector 204 includes a mass 420 coupled to an end of a flexible membrane 424 and thin electrical traces 422 (strain gauge element) on flexible membrane 424 and operably coupled to PCBA 406. FIGS. 4B1 and 4B2 illustrate membrane 424 flexing along opposite directions, respectively, as illustrated by the arrows. The flexing of membrane 424 effectively lengthens and thins (flexes, compresses, and/or elongates) the traces 422, increasing the resistance through the trace pattern. Kinetic energy from movement of the headset causes variations in the resistance of the trace pattern, thereby allowing for determination of a donned or doffed state of the headset.

Figure 5A:
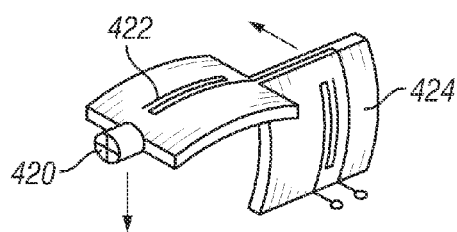
Figure 5A:
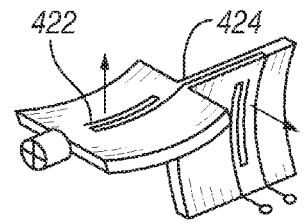
Figure 5A:
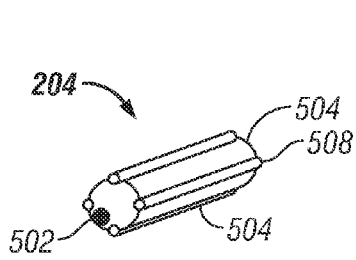
Figure 5B:
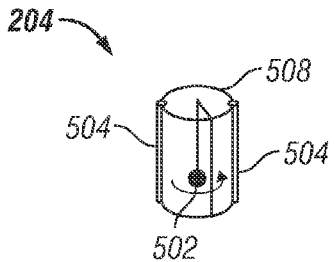

FIGS. 5A and 5B illustrate a detector 204 including a movable conductor 502 and a capsule 508 having electrical contacts 504 in accordance with an embodiment. FIG. 5A illustrates conductor 504 that is loosely contained within capsule 508, and FIG. 5B illustrates conductor 502 that is suspended within capsule 508. Conductor 502 is made of electrically conductive material and movable such that gravity and/or inertia causes conductor 502 to move with respect to the headset whenever the headset wearer moves the headset. Electrical contacts 504 are positioned within capsule 508 such that contact with movable conductor 502 causes an electric current or output charge to be produced, which is amplified, sent to a donned and doffed determination circuit, and processed as described above to determine a state of the headset.

In FIG. 5A, conductor 502 closes a circuit by bridging a gap between electrical contacts 504, allowing an electric current to flow intermittently. In FIG. 5B, conductor 502 is suspended from a pivot point inside the headset so that headset movement causes the conductor to move and touch contact points that surround the conductor, effectively closing and opening a circuit to thereby allow electric current to flow intermittently.

In another example, the electrical contacts may be configured in groups of two or more sets so that the motion of the weight in differing directions may be registered, thereby providing more data for determining the headset state. For example, a movable conductive mass is loosely contained in a housing that includes many contacts, such that movement of the mass opens and closes circuits as the mass makes and breaks contact with the housing contacts. The sensitivity of this detector can be tuned to detect the axis or direction of the movement, where alternate contacts are connected to different points on the circuit. Accordingly, this configuration can be arranged to determine when the user of the headset is shaking his or her head from side-to-side or nodding up and down, differentiating between the two motions by monitoring which circuit(s) are opening and closing, thereby allowing the user to input information into the headset, such as when responding to a call-answer prompt with a nod "yes" or shake of the head "no".

FIGS. 5C, 5C1, 5C2, and 5C3 illustrate in greater detail an embodiment of a detector 204 including a movable conductor 502 and a fixed capsule 508 having electrical contacts 504 operably coupled to a PCBA 506. Conductor 502 is freely movable within spherical capsule 508 (as shown by arrows in FIG. 5C1), and creates or closes different circuits 512 as conductor 502 makes contact with electrical contacts 504 (as shown by FIGS. 5C2 and 5C3).

FIGS. 6A and 6B illustrate a detector 204 including a light source 602, a photosensor 606, and a movable reflective surface 604, 608 therebetween in accordance with an embodiment. FIG. 6A illustrates surface 604 that may be suspended, pinned, or loosely trapped, such that surface 604 at a rest state allows photosensor 606 to receive light from light source 602. Movement of the headset causes surface 604 to move such that photosensor 606 detects a change in the amount of light received and induces fluctuating current flow in a nearby electrical conductor. Alternatively, in FIG. 6B, surface 608 may be suspended, pinned, or loosely trapped, such that surface 608 at a rest state impedes light from reaching photosensor 606. Movement of the headset causes surface 608 to move such that photosensor 608 detects a change in the amount of light received and induces fluctuating current flow in a nearby electrical conductor. The current flow or output charge produced is amplified, sent to a donned and doffed determination circuit, and processed as described above to determine a state of the headset. In yet another example, surface 604, 608 could include a hole through which light from light source 602 travels, thereby providing changed amount of light received by photosensor 606 as the surface 604, 608 moves as the headset is moved.

As noted above, detector 204 may include a non-motion detector that provides output charges based upon a headset characteristic such as temperature and/or capacitance. When a headset is properly worn, several surfaces of the headset touch or are in operable contact with the user. These touch/contact points can be monitored and used to determine the donned or doffed state of the headset.

FIG. 7 illustrates an infra-red (IR) detector 702 that is sensitive to the temperature of a human body. Humans having a skin temperature of about 93 degrees Fahrenheit, radiate infra-red energy with a wavelength between about 9 and 10 micrometers. Therefore, the IR detector may be configured to be sensitive in the range of 8 to 12 micrometers, and may be positioned to aim at a point where the headset is intended to contact a user's skin, such as the user's skin or hair. When the headset user dons the headset, the IR detector 702 detects radiation in the wavelengths between 9 and 10 micrometers and provides an electrical signal or output charge that is amplified, sent to a donned and doffed determination circuit, and processed as described above to determine a state of the headset.

FIGS. 8A and 8B illustrate a pyroelectric sensor 802 that is positioned in close proximity to a point where the headset is intended to contact a user's skin. The sensor detects a user is present by determining a skin temperature near 93 degrees Fahrenheit and then providing an electrical signal or output charge that is amplified, sent to a donned and doffed determination circuit, and processed as described above to determine a state of the headset. As shown in FIG. 8B, two pyroelectric sensors 802*a* and 802*b* may be used, with one sensor positioned close to a contact point and the other positioned in a location away from a contact point. Differences (a delta) between the readings of the two sensors can be used to determine a donned or doffed state of the headset, for example if the delta of the two temperature readings is at or above a predetermined level.

FIG. 9 illustrates an electronic circuit 902 sensitive to capacitance positioned in close proximity to a point where the headset is intended to contact a user's skin. The circuit detects an increase in capacitance when the headset is worn and provides an output charge that is amplified, sent to a donned and doffed determination circuit, and processed as described above to determine a state of the headset.

Figure 10:
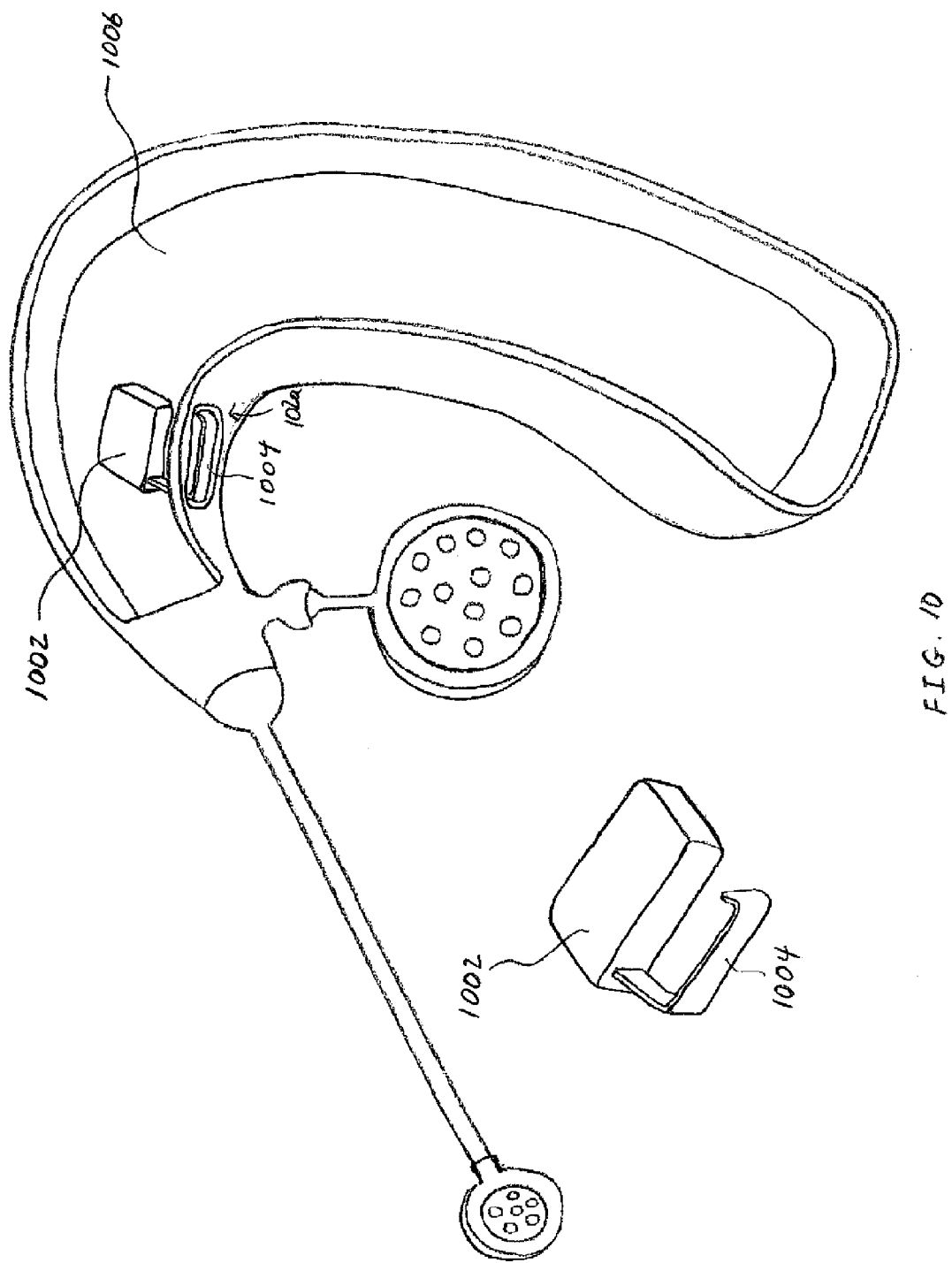

Other detectors that may be used at a touch point include micro-switches, as shown in FIG. 10. A micro-switch 1002 can be housed and operably coupled to a PCBA 1006 within the headset device such that an actuator 1004 of the switch is positioned at a touch point 102*a* of the headset, thereby being depressed when the headset is worn. A determination circuit in PCBA 1006 can monitor the state of the switch, thereby determining the state of the headset.

Figure 11:
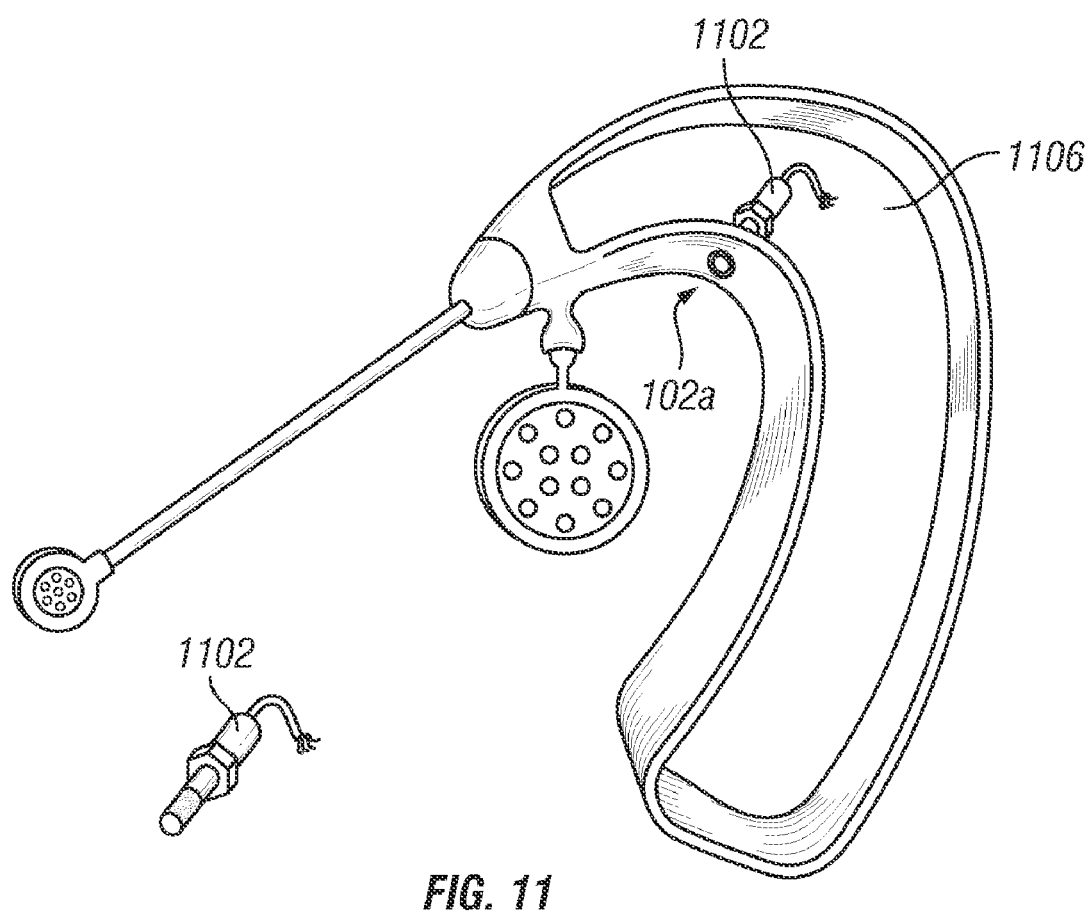

Another detector that may be used includes an inductive proximity sensor 1102, as shown in FIG. 11. A proximity switch 1102 can be housed and operably coupled to a PCBA 1106 within the headset device such that the switch 1102 is positioned at a touch point 102*a* of the headset, thereby being triggered or activated when the headset is worn. This use of a proximity switch does not require force from the user's skin, but proximity to the user (without consistent force) such that a change in magnetic field is detected is sufficient to trigger the sensor. A determination circuit in PCBA 1106 can monitor the state of the switch, discriminating between a donned or doffed state of the headset.

Figure 12:
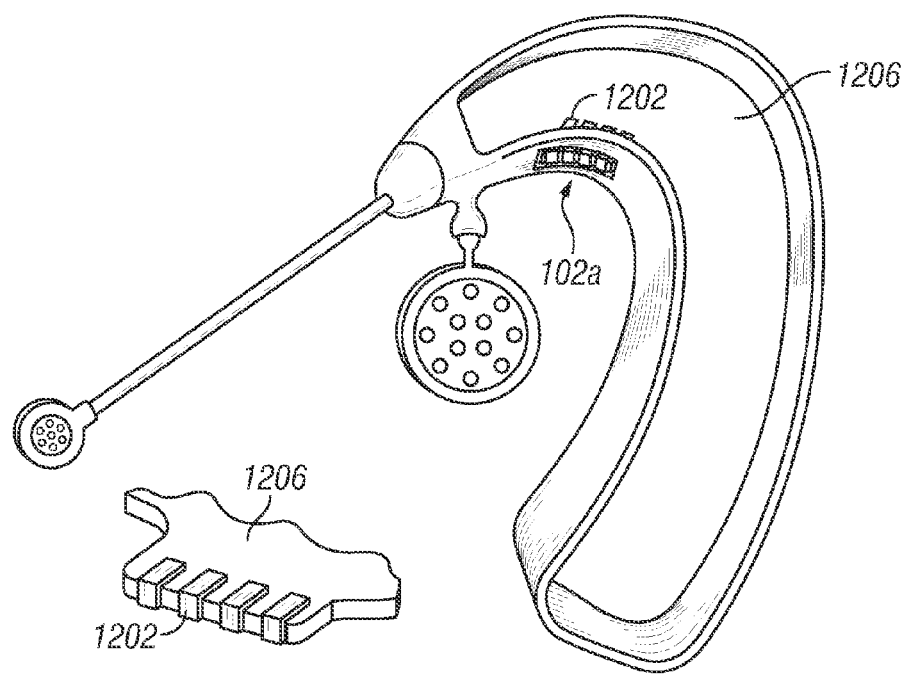

Yet another detector that may be used includes a skin resistivity sensor 1202, as shown in FIG. 12. Conductive materials 1202 can be used at two or more touch points 102*a* on the headset, and a circuit in PCBA 1206 can monitor the resistance between these conductive materials, thereby detecting a resistance that is consistent with a predetermined range, thus discriminating between a donned and a doffed state of the headset. That is, when the two or more contact points are in contact with the user's skin, the resistance reading between these contact points will be different from when the headset is not worn, for example the resistance being reduced when the headset is worn due to the skin adding conductance.

Figure 13:
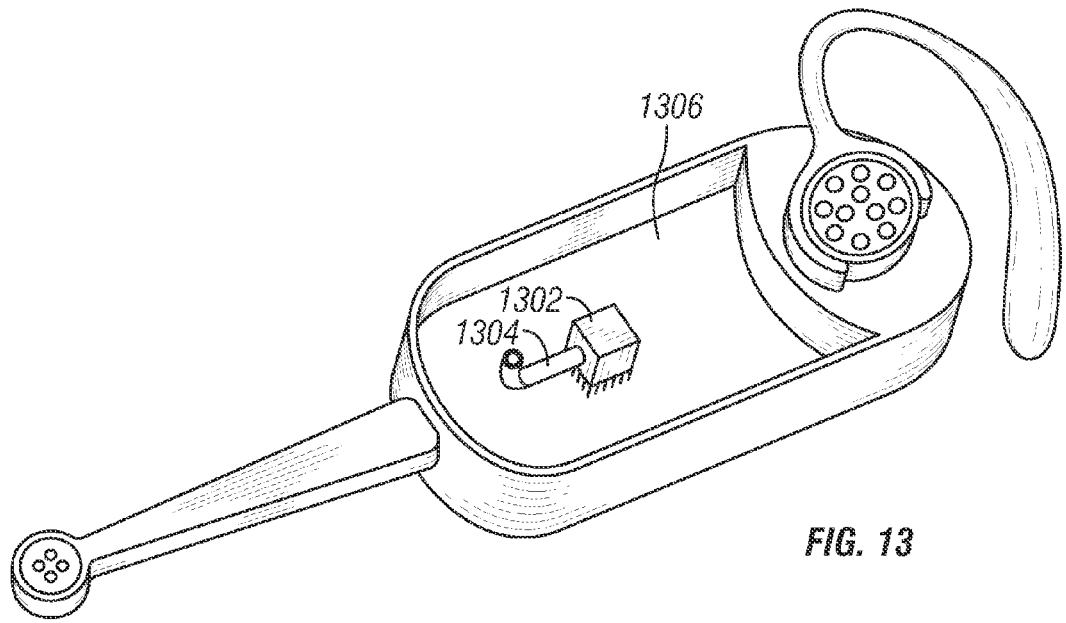

Referring now to FIG. 13, another detector that may be utilized includes a carbon dioxide ($CO_2$) sensor 1302 operably coupled to a PCBA 1306 and a channel 1304 in accordance with an embodiment. Sensor 1302 is able to detect an increase of $CO_2$, thereby inferring a donned state of a headset. In one embodiment, sensor 1302 is able to subtract background $CO_2$ levels to more accurately discriminate between donned and doffed states, and in another embodiment, sensor 1302 and a determination circuit are able to detect patterns of $CO_2$ levels correlating to human breathing patterns.

It is noted that a variety of detectors that provide an output charge pattern corresponding to a donned or doffed state of a headset are within the scope of the present invention.

In critical applications, two or more of the embodiments described above may be used in one headset in order to determine a donned or doffed headset state with greater accuracy and reliability. For example, in one case with one motion detector and one non-motion detector being used, a headset state can be indicated when both detectors indicate the same state.

Figure 14:
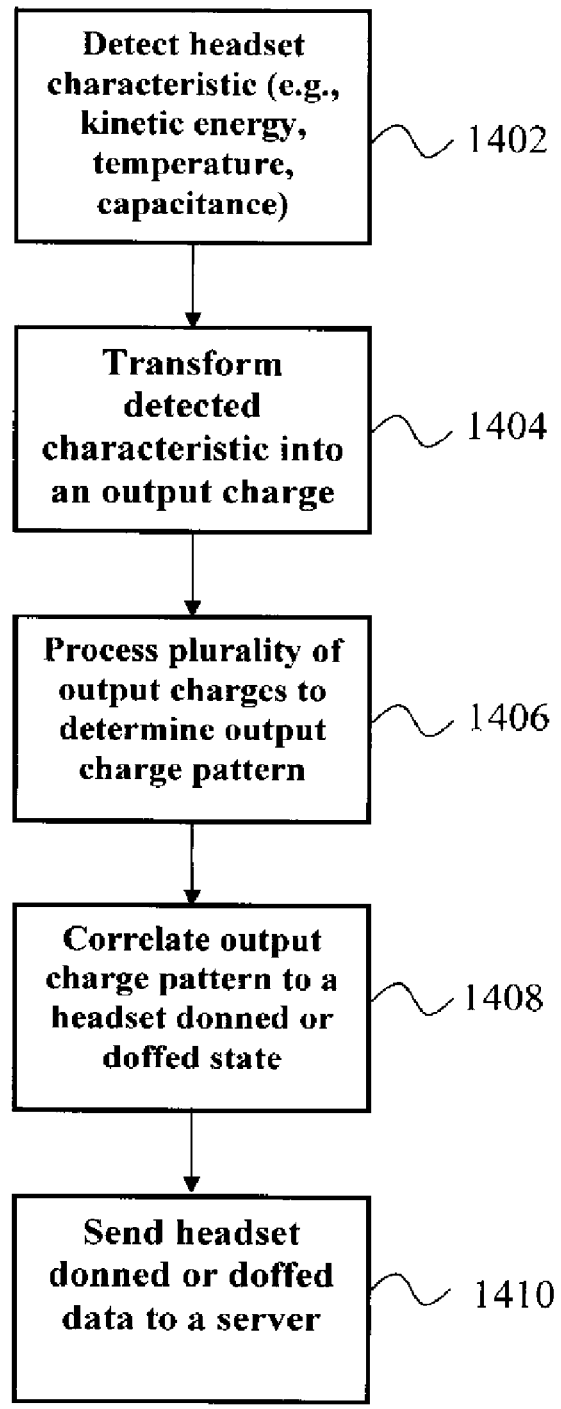
FIG. 14 is a flowchart showing a method of determining a donned or doffed state of a headset.

Referring now to FIG. 14 in conjunction with FIGS. 1 and 2, a flowchart of a method for determining the donned or doffed state of a headset is illustrated in accordance with an embodiment. At step 1402, a headset characteristic, such as kinetic energy, temperature, and/or capacitance, is detected by a detector 204. At step 1404, the detector provides an output charge corresponding to a detected characteristic. The output charge is amplified and transferred to determination circuit 205. At step 1406, a plurality of output charges are processed by determination circuit 205 to determine an output charge pattern. At step 1408, determination circuit 205 correlates the output charge pattern to a donned or doffed state of a headset, in one example comparing the output charge pattern to predetermined output charge profiles that reflect a donned or doffed state of a headset. The predetermined output charge profiles may be in look-up tables or a database and may include a variety of parameters, such as for particular headsets and detectors being used. At step 1410, the headset state may be sent to server 104 for routing of calls or messages, or for notifying a system regarding volume control for hearing impaired use.

Further discussion regarding the use of sensors or detectors to detect a donned or doffed state can be found in the commonly assigned and co-pending U.S. patent application Ser. No. 11/542,385, entitled "Donned and Doffed Headset State Detection" which was filed on Oct. 2, 2006, and which is hereby incorporated into this disclosure by reference.

Figure 15:
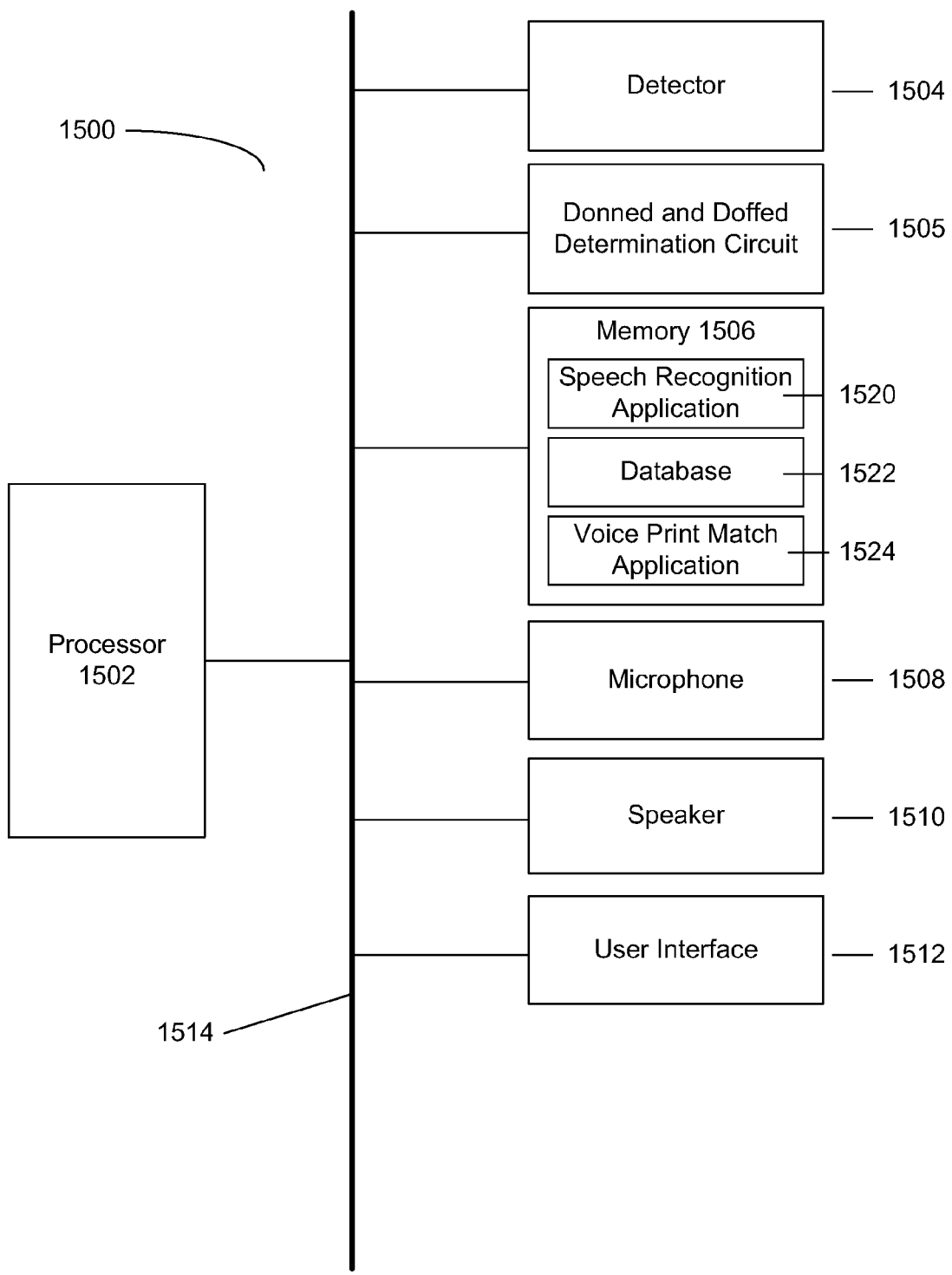
FIG. 15 illustrates a simplified block diagram of a headset capable of indicating a donned or doffed state and capable of performing user validation utilizing voice print identification or password speech recognition in one example of the invention.

FIG. 15 illustrates a simplified block diagram of a headset 1500 capable of indicating a donned or doffed state and capable of performing user validation utilizing voice print identification or password speech recognition in one example of the invention.

In one example, the headset does not rely on the use of a server. The headset 1500 includes a processor 1502 operably coupled via a bus 1514 to a detector 1504, a donned and doffed determination circuit 1505, a memory 1506, a microphone 1508, a speaker 1510, and an optional user interface 1512.

Memory 1506 includes a database 1522 or other file/memory structure for storing user validation data as described herein, a speech recognition application 1520 for recognizing the content of user speech, and a voice print match application 1524 for comparing the voice print of user received speech to an authorized voice print stored in database 1522. Although shown as separate applications, speech recognition application 1520 and voice print match application 1524 may be integrated into a single application. In one example of the invention, voice print match application 1524 is optional, and only speech recognition application 1520 is present. In a further example, speech recognition application 1520 is optional, and only voice print match application 1524 is present. Memory 1506 also includes pre-stored audio prompts for output through the headset speaker 1510 which prompt the user to speak his name, voice print phrase key, or password.

Memory 1506 may include a variety of memories, and in one example includes SDRAM, ROM, flash memory, or a combination thereof. Memory 1506 may further include separate memory structures or a single integrated memory structure. In one example, memory 1506 may be used to store passwords, network and telecommunications programs, and/or an operating system (OS). In one embodiment, memory 1506 may store determination circuit 1505, output charges and patterns thereof from detector 1504, and predetermined output charge profiles for comparison to determine the donned and doffed state of a headset.

Processor 1502, using executable code and applications stored in memory, performs the necessary functions associated with user validation and headset operation described herein. Processor 1502 allows for processing data, in particular managing data between detector 1504, determination circuit 1505, and memory 1506 for determining the donned or doffed state of headset 1500 or 1506, and determining whether the state of the headset has switched from being doffed to donned. Processor 1502 further processes user speech received at microphone 1508 using speech recognition application 1520 and voice print match application 1524. In one example, processor 1502 is a high performance, highly integrated, and highly flexible system-on-chip (SoC), including signal processing functionality such as echo cancellation/reduction and gain control in another example. Processor 1502 may include a variety of processors (e.g., digital signal processors), with conventional CPUs being applicable.

The structure and operation of detector 1504 and donned and doffed determination circuit 1505 in one example are as described herein above in reference to FIG. 2. For example, detector 1504 may be a motion detector. The motion detector may take a variety of forms such as, for example, a magnet and a coil moving relative to one another, or an acceleration sensor having a mass affixed to a piezoelectric crystal. The motion detector may also be a light source, a photosensor, and a movable surface therebetween. In further examples, the detector may include one or more of the following: an infrared detector, a pyroelectric sensor, a capacitance circuit, a micro-switch, an inductive proximity switch, a skin resistance sensor, or at least two pyroelectric sensors for determining a difference in temperature readings from the two pyroelectric sensors.

In one example the headset continuously monitors donned and doffed status of the headset. Upon detection that the headset is in a newly donned status, the user validation process begins. Upon detection of a doffed status, any prior validation is terminated. In a further example, headset 1500 includes a network interface whose operation is substantially similar to that described herein above in reference to FIG. 2.

User interface 1512 allows for manual communication between the headset user and the headset, and in one example includes an audio and/or visual interface such that an audio prompt may be provided to the user's ear and/or an LED may be lit.

FIG. 16A illustrates a simplified block diagram of the components of the database 1522 stored at the headset shown in FIG. 15. In one example, for each authorized user of the headset, database 1522 will include the user name/ID 1602, voice print phrase key 1604, and password/PIN 1606. The user name/ID 1602 and password/PIN may be in alphanumeric text format. In the example shown in FIG. 16A, the headset operates to validate the headset user using either voice print matching or voice recognition of a password or PIN, or both.

FIG. 16B illustrates a simplified block diagram of the components of the database 1522 in a further example. In this example, for each authorized user of the headset, database 1522 will include the user name/ID 1608 and voice print phrase key 1610. The user name/ID 1608 and voice print phrase key 1610 are as described in FIG. 16A. In the example shown in FIG. 16B, the headset operates to validate the headset user using voice print matching.

FIG. 16C illustrates a simplified block diagram of the components of the database 1522 in a further example. In one example, for each authorized user of the headset, database 1522 will include the user name/ID 1612 and password/PIN 1614. The user name/ID 1612 and password/PIN 1614 are in alphanumeric text format. In the example shown in FIG. 16C, the headset operates to validate the headset user using voice recognition of a password or PIN.

Figure 17A:
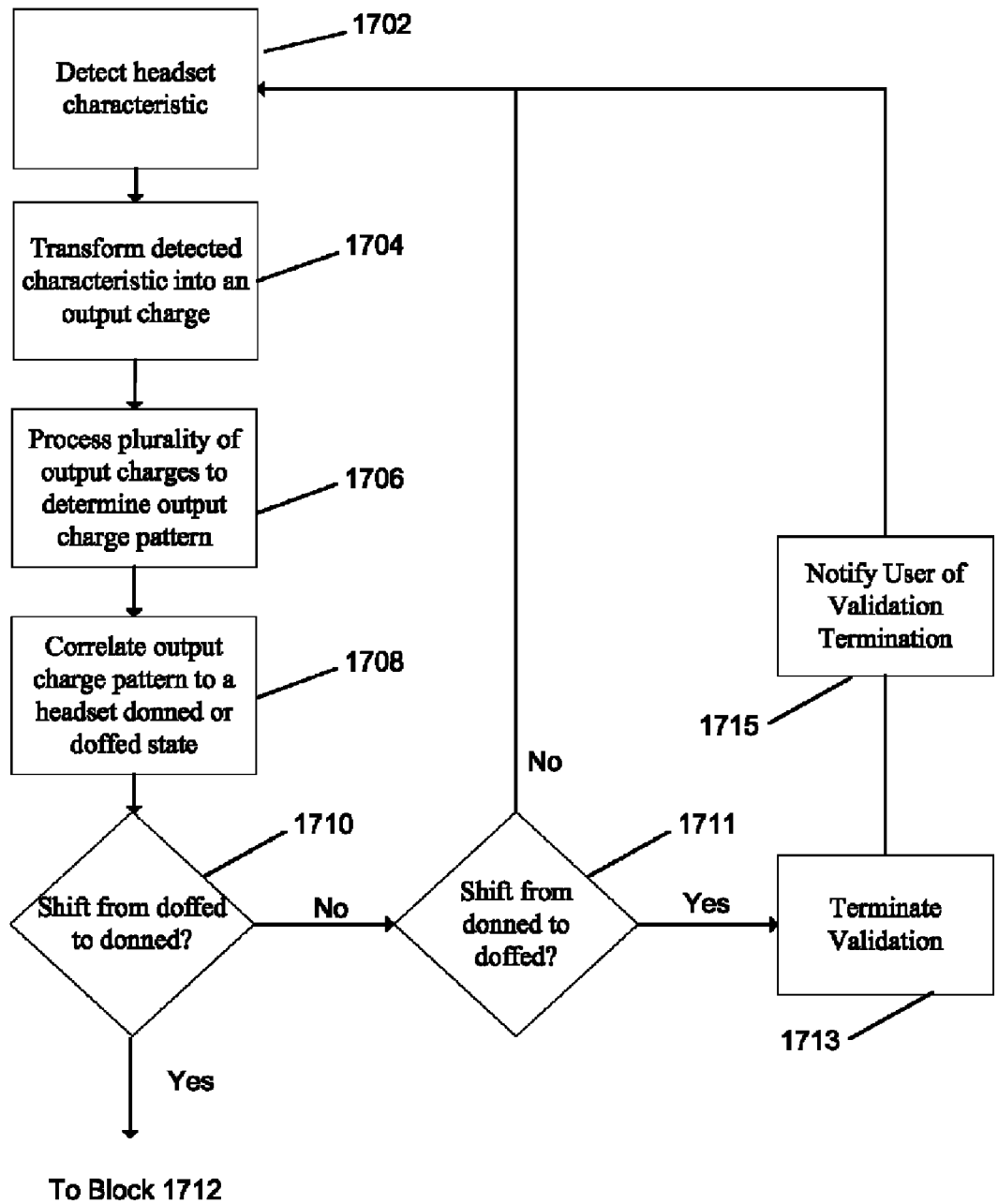
FIGS. 17A-17C represent a flowchart illustrating an exemplary process by which the system in FIG. 15 operates to validate the headset user using voice print matching.
Figure 17B:
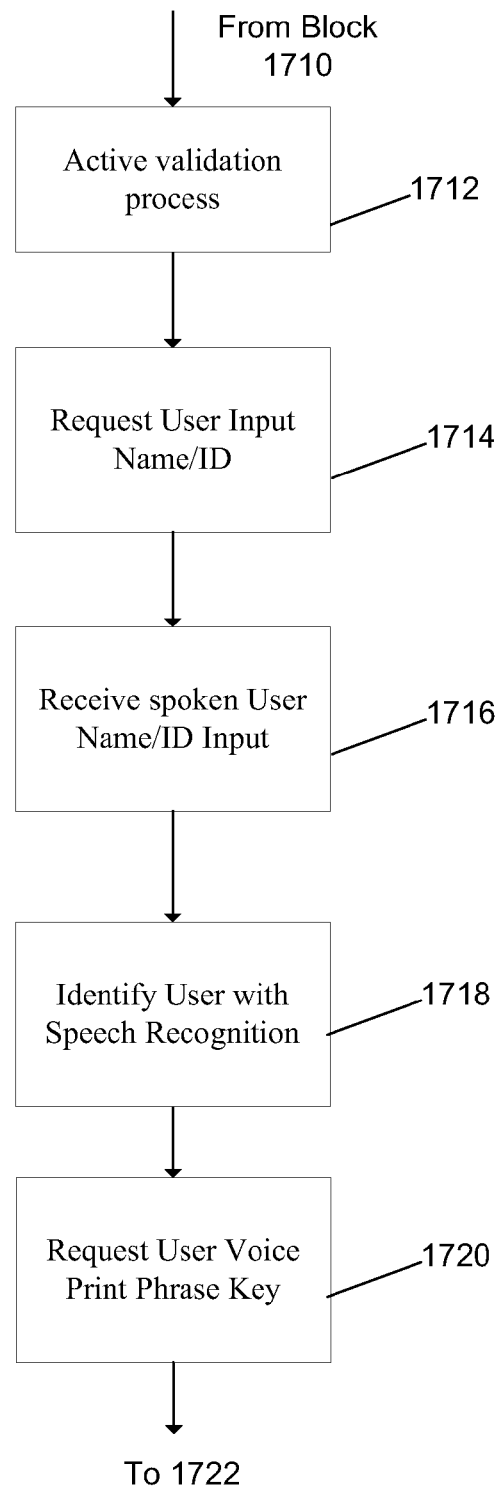
Figure 17C:
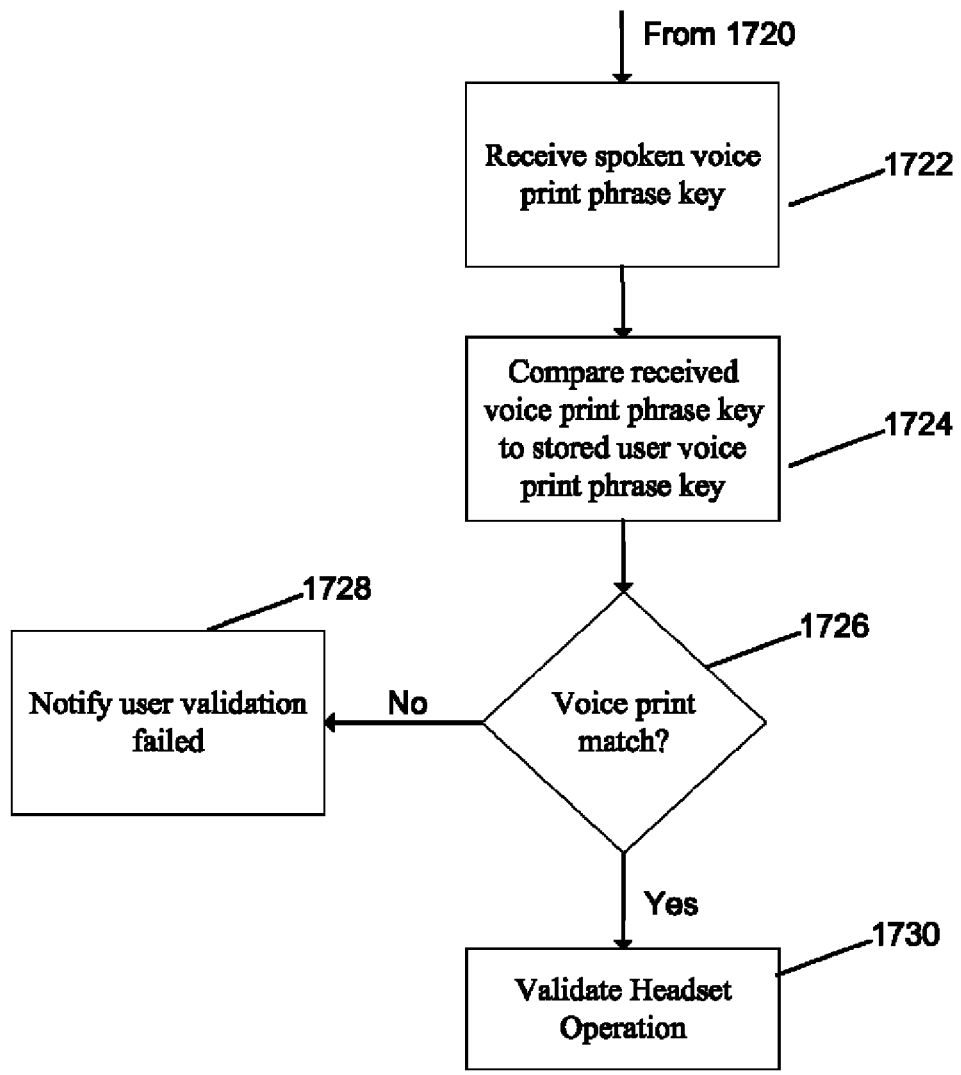

FIGS. 17A-17C are a flowchart illustrating an exemplary process by which the system in FIG. 15 operates to validate the headset user using voice print matching. At block 1702, a headset characteristic, such as kinetic energy, temperature, and/or capacitance, is detected by a detector 204. At block 1704, the detector provides an output charge corresponding to a detected characteristic. The output charge is amplified and transferred to determination circuit 205. At block 1706, a plurality of output charges are processed by determination circuit 1505 to determine an output charge pattern. At block 1708, determination circuit 1505 correlates the output charge pattern to a donned or doffed state of a headset, in one example comparing the output charge pattern to predetermined output charge profiles that reflect a donned or doffed state of a headset. The predetermined output charge profiles may be in look-up tables or a database and may include a variety of parameters, such as for particular headsets and detectors being used.

In one example, at decision block 1710, the headset controller determines whether the headset has shifted from a doffed state to a donned state. If no at decision block 1710, then at decision block 1711, it is determined whether the headset has shifted from a donned state to a doffed state. If yes at decision block 1711, validation of the headset is terminated at block 1713. Upon termination of validation, any headset functions requiring validation are locked/disabled and the user may be notified of the termination at block 1715. In this manner, unauthorized use of the headset is prevented. Following block 1715, the process returns to block 1702. If no at decision block 1711, the process returns to block 1702.

If yes at decision block 1710, then at block 1712 the user validation process is activated. In additional example processes, the validation process is activated upon detection of a donned status where validation has not previously occurred. For example, the validation process may be activated upon powering on of the headset and donning or while donned. In further examples, timing of the validation process upon DON detection in relation to headset usage may be varied.

Once the validation process has been activated, at block 1714, a request is made for the user to input either their name or user identification. In one example, the user inputs their name or identification by speaking into the headset microphone. At block 1716, the spoken name or identification is received. At block 1718, the user is identified by processing the spoken name or identification using speech recognition. At block 1720, a request is made to the user to speak their user voice print phrase key. The user voice print phrase key is correlated to each authorized user name or identification. At block 1722, the spoken user voice print phrase key is received. At block 1724, the received voice print phrase key is compared to the stored user voice print phrase key.

At decision block 1726, it is determined whether the user validation is approved based upon whether there is a voice print match between the spoken voice print phrase key and the stored user voice print phrase key. If no at decision block 1726, then at block 1728 the user is notified of validation failure. If yes at decision block 1726, then at block 1730 the headset operation is validated and any headset functions requiring validation are unlocked and available for use. The process then returns to block 1702. In one example, only select headset functions (e.g., access to user information, use of headset to access an automated teller machine, etc.) require validation for use while other headset functions (e.g., basic voice communications) are operational irrespective of whether the headset is in a validated or not validated state. In a further example, all headset functions are locked when the headset is not in a validated state. In a further example, voice recognition of the user name/ID is not needed, and the user may enter his or her name/ID via an alphanumeric keypad or other means, or proceed directly to voice print upon donning of the headset.

Figure 18A:
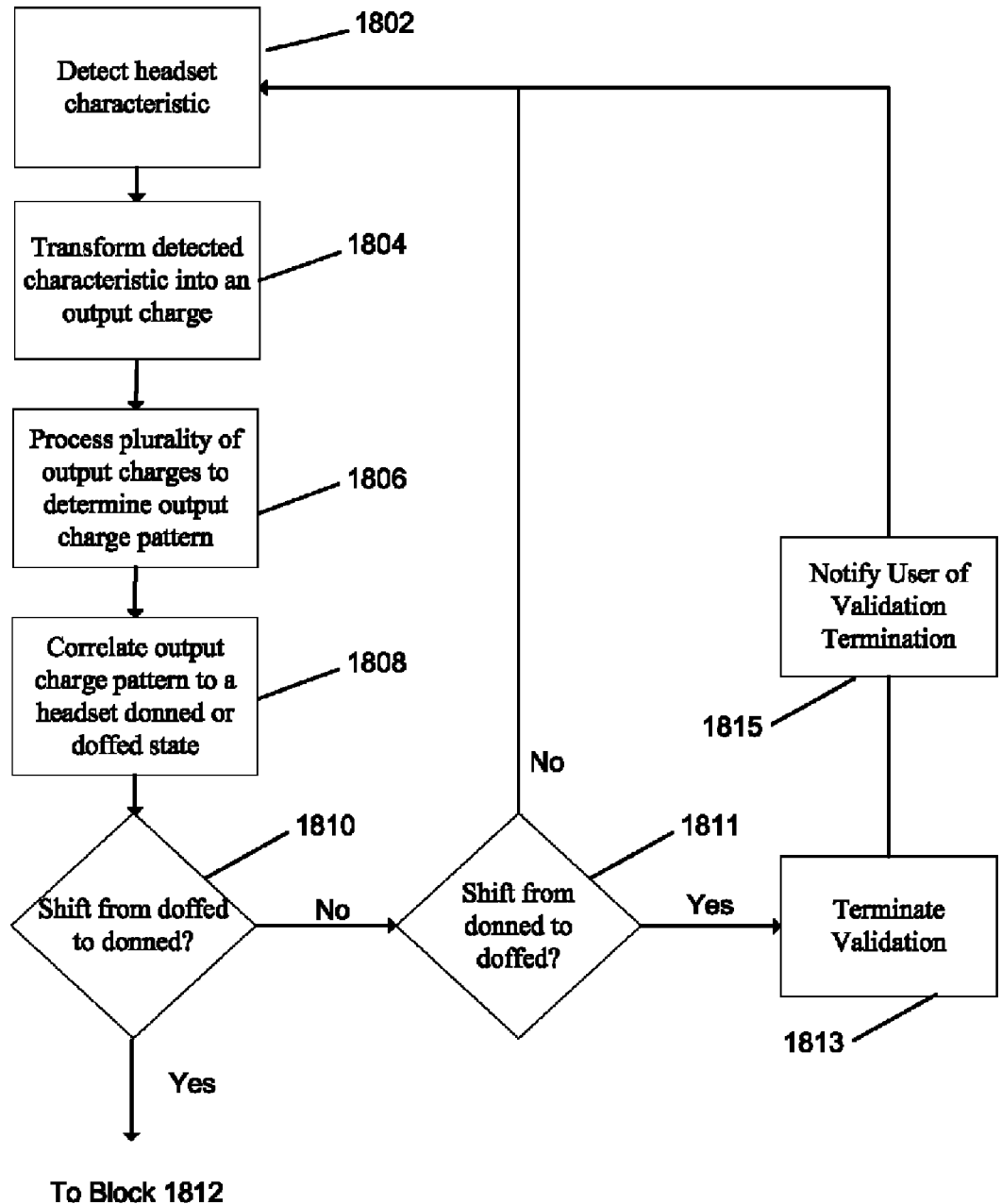
FIGS. 18A-18C represent a flowchart illustrating an exemplary process by which the system in FIG. 15 operates to validate the headset user using password speech recognition.
Figure 18B:
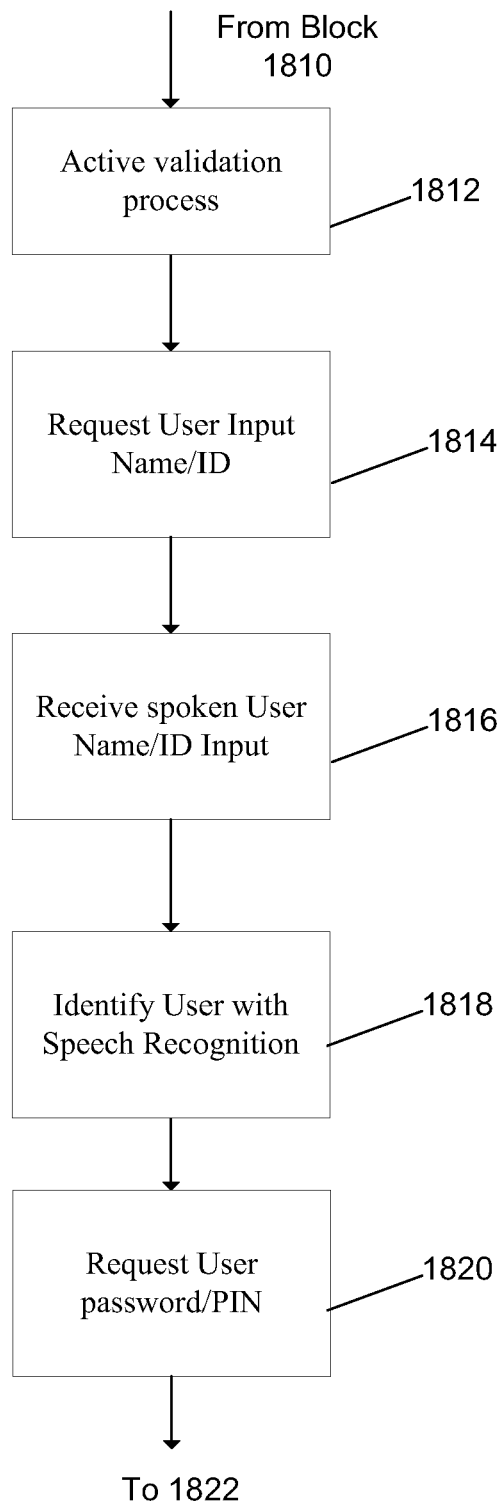
Figure 18C:
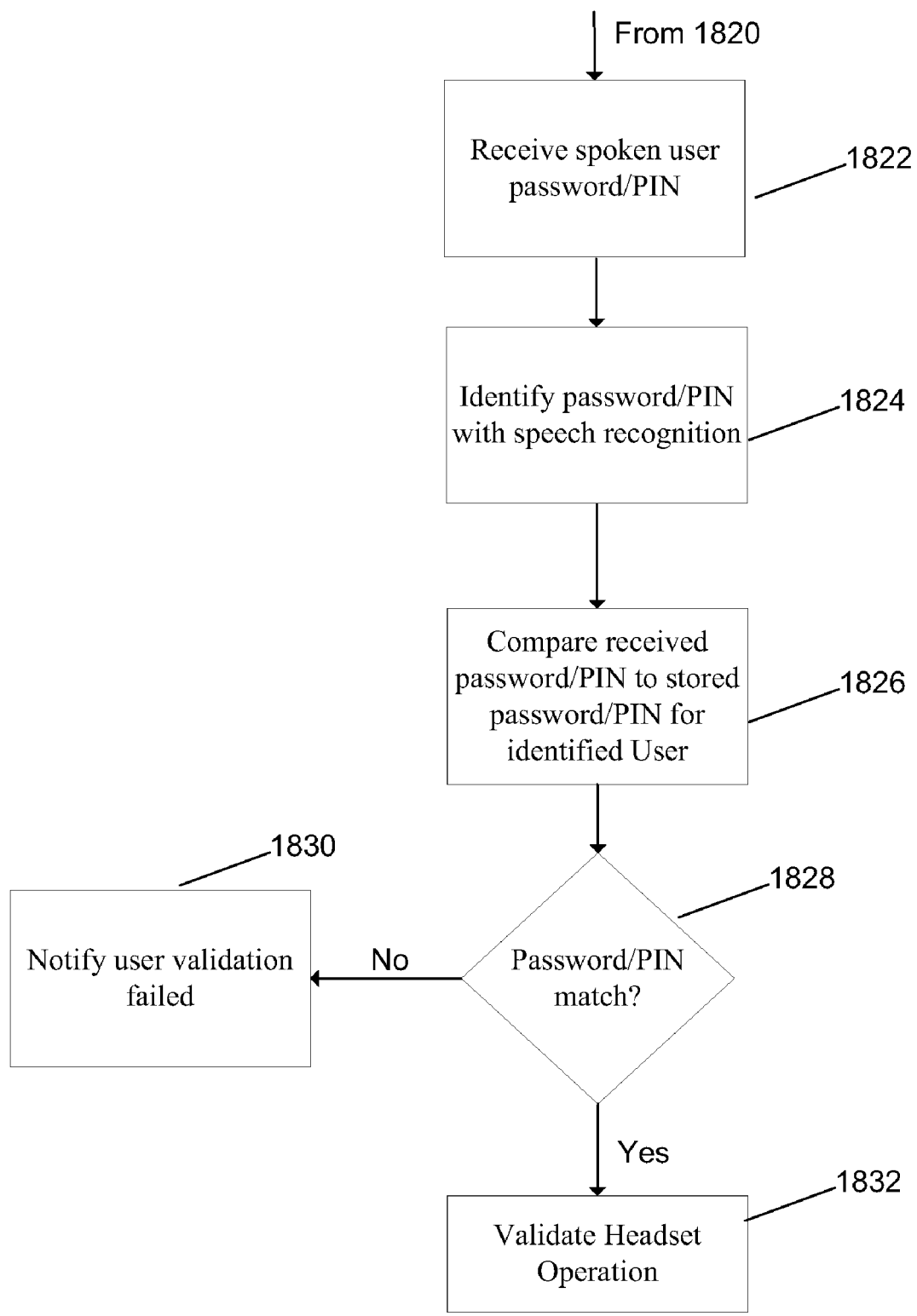

FIGS. 18A-18C are a flowchart illustrating an exemplary process by which the system in FIG. 15 operates to validate the headset user using password speech recognition. At block 1802, a headset characteristic, such as kinetic energy, temperature, and/or capacitance, is detected by a detector 204. At block 1804, the detector provides an output charge corresponding to a detected characteristic. The output charge is amplified and transferred to determination circuit 205. At block 1806, a plurality of output charges are processed by determination circuit 1505 to determine an output charge pattern. At block 1808, determination circuit 1505 correlates the output charge pattern to a donned or doffed state of a headset, in one example comparing the output charge pattern to predetermined output charge profiles that reflect a donned or doffed state of a headset.

The predetermined output charge profiles may be in look-up tables or a database and may include a variety of parameters, such as for particular headsets and detectors being used. In one example, at decision block 1810, the headset controller determines whether the headset has shifted from a doffed state to a donned state. If no at decision block 1810, then at decision block 1811, it is determined whether the headset has shifted from a donned state to a doffed state. If yes at decision block 1811, validation of the headset is terminated at block 1813. Upon termination of validation, any headset functions requiring validation are locked/disabled and the user may be notified of the termination at block 1815. In this manner, unauthorized use of the headset is prevented. Following block 1815, the process returns to block 1802. If no at decision block 1811, the process returns to block 1802.

If yes at decision block 1810, then at block 1812 the user validation process is activated. In additional example processes, the validation process is activated upon detection of a donned status where validation has not previously occurred.

For example, the validation process may be activated upon powering on of the headset and donning or while donned. In further examples, timing of the validation process upon DON detection in relation to headset usage may be varied.

Once the validation process has been activated, at block 1814, a request is made for the user to input either their name or user identification. In one example, the user inputs their name or identification by speaking into the headset microphone. At block 1816, the spoken name or identification is received. At block 1818, the user is identified by processing the spoken name or identification using speech recognition. At block 1820, a request is made to the user to speak their user password or PIN. For each user, an authorized user password or PIN has been previously stored at the headset and is correlated to each authorized user name or identification. At block 1822, the spoken user password or PIN is received. At block 1824, the received spoken user password or PIN is recognized using voice recognition. For example, the spoken user password or PIN is converted to an alphanumeric string.

At block 1826, the received password or PIN is compared to the previously stored password or PIN for the identified user. At decision block 1828, it is determined whether the user validation is approved based upon whether there is a match between the recognized password or PIN and the stored password or PIN. If no at decision block 1828, then at block 1830 the user is notified of validation failure. If yes at decision block 1828, then at block 1832 the headset operation is validated and any headset functions requiring validation are unlocked and available for use. The process then returns to block 1802. In one example, only select headset functions (e.g., access to user information, use of headset to access an automated teller machine, etc.) require validation for use while other headset functions (e.g., basic voice communications) are operational irrespective of whether the headset is in a validated or not validated state. In a further example, all headset functions are locked when the headset is not in a validated state. In a further example, voice recognition of the user name/ID is not required, and the headset proceeds directly to voice recognition of the user spoken password or PIN.

Figure 19:
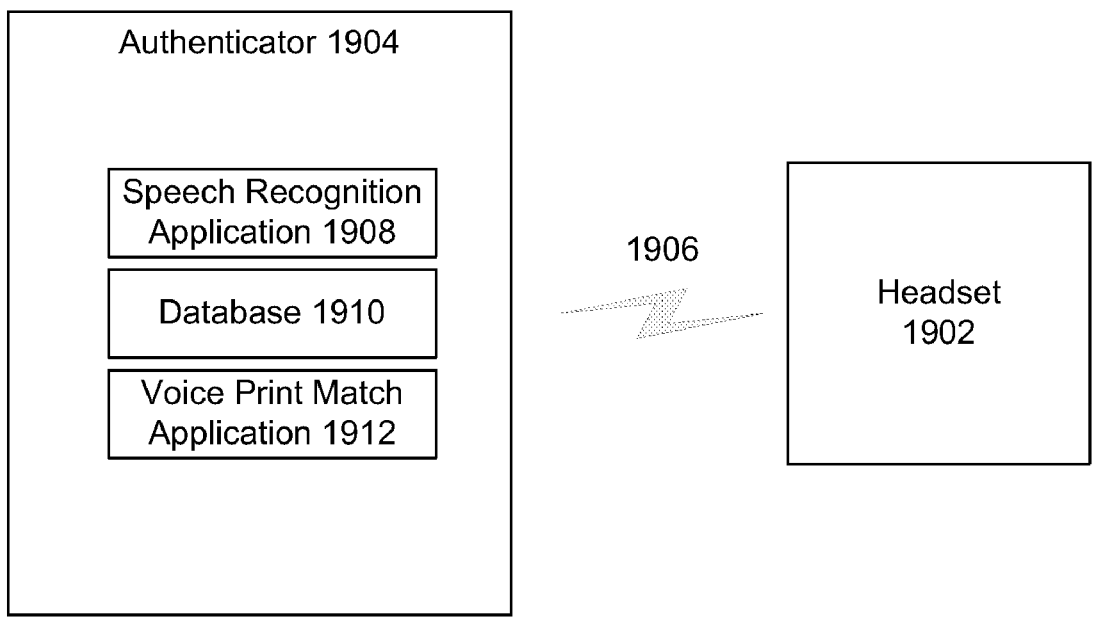
FIG. 19 illustrates a headset system including a headset in communication with a remote authentication device which performs either voice print validation or password speech recognition authorization.

FIG. 19 illustrates a headset system including a headset 1902 in communication with a remote authenticator device 1904 via communication link 1906. Communication link 1906 may either be a wireless or wired link. Authentication device 1904 includes a speech recognition application 1908, database 1910, and voice print match application 1912. The authenticator device 1904 receives the user speech from headset 1902 and performs either voice print validation or password speech recognition authorization as described herein in reference to FIGS. 15-18. In this example, authenticator device 1904 monitors the Don/Doff state of headset 1902 and terminates validation (i.e., deauthenticates the user) if the headset is Doffed. Authentication device 1904 may be any type of computing device. For example, authenticator device 1904 may be a cellular telephone, wireless VoIP phone, wired VoIP phone, or other mobile computing device.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, the methods and systems described herein may be applied to other body worn devices in addition to headsets. Furthermore, the functionality associated with any blocks described above may be centralized or distributed. It is also understood that one or more blocks of the headset may be performed by hardware, firmware or software, or some combinations thereof. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A headset comprising:
   a detector providing an output indicating a donned or doffed condition;
   a memory storing a pre-determined voice print phrase key of an authorized headset user;
   a microphone;
   a processor;
   a speaker; and
   a voice print match application for receiving a user speech corresponding to a submitted voice print phrase key upon determining a donned condition and prompting the authorized headset user with a prestored audio prompt to speak a voice print phrase key, wherein the user speech is compared to the pre-determined voice print phrase key to validate an identity of the authorized headset user.

2. The headset of claim 1, wherein the detector comprises a motion detector.

3. The headset of claim 2, wherein the motion detector includes a magnet and a coil moving relative to one another.

4. The headset of claim 2, wherein the motion detector includes an acceleration sensor having a mass affixed to a piezoelectric crystal.

5. The headset of claim 2, wherein the motion detector includes a light source, a photosensor, and a movable surface therebetween.

6. The headset of claim 1, wherein the detector comprises one selected from the group consisting of an infra-red detector, a pyroelectric sensor, a capacitance circuit, a microswitch, an inductive proximity switch, a skin resistance sensor, and at least two pyroelectric sensors for determining a difference in temperature readings from the two pyroelectric sensors.

7. A headset comprising:
   a detector providing an output indicating a donned or doffed condition;
   a memory storing a valid password or personal identification number of an authorized headset user;
   a microphone;
   a processor;
   a speaker; and
   a speech recognition application for receiving a user speech corresponding to a password or personal identification number upon determining a donned condition and prompting the authorized headset user with a prestored audio prompt to speak a password or personal identification number, wherein a submitted password or personal identification number recognized from the user speech is compared to the valid password or personal identification number to validate an identity of the authorized headset user.

8. The headset of claim 7, wherein the detector comprises a motion detector.

9. The headset of claim 8, wherein the motion detector includes a magnet and a coil moving relative to one another.

10. The headset of claim 8, wherein the motion detector includes an acceleration sensor having a mass affixed to a piezoelectric crystal.

11. The headset of claim 8, wherein the motion detector includes a light source, a photosensor, and a movable surface therebetween.

12. The headset of claim 7, wherein the detector comprises one selected from the group consisting of an infra-red detector, a pyroelectric sensor, a capacitance circuit, a microswitch, an inductive proximity switch, a skin resistance sensor, and at least two pyroelectric sensors for determining a difference in temperature readings from the two pyroelectric sensors.

13. A method for validating the identity of a headset wearer comprising:
- detecting kinetic energy, temperature or capacitance to determine a headset characteristic;
- processing the headset characteristic to determine a donned condition or a doffed condition;
- receiving a spoken user voice print phrase key upon detection of the donned condition, and
- comparing the spoken user voice print phrase key to a stored authorized user voice print phrase key stored on the headset to validate an identity of a headset wearer to authorize a use of a headset.

14. The method of claim 13, further comprising determining whether a headset state has shifted from a doffed condition to a donned condition.

15. The method of claim 13, further comprising entering a validated state upon validation of the identity of the headset wearer.

16. The method of claim 13, further comprising terminating a validated state upon determination of a doffed condition.

17. The method of claim 13, further comprising receiving a spoken user name upon detection of the donned condition.

18. A method for validating the identity of a headset wearer comprising:
- detecting kinetic energy, temperature or capacitance to determine a headset characteristic;
- processing the headset characteristic to determine a donned or doffed condition;
- receiving user speech comprising a password or personal identification number upon detection of a donned condition;
- recognizing the password or personal identification number;
- comparing the password or personal identification number to a stored authorized user password or personal identification number stored on the headset to validate an identity of a headset wearer; and
- terminating validation upon detection of a doffed condition.

19. The method of claim 18, further comprising receiving user speech comprising a user name.

20. A headset comprising:
- a detector means for providing an output indicating a donned or doffed condition;
- a memory means for storing an authorized voice print phrase key of a headset user;
- a prompting means for audibly prompting the user to submit user speech;
- a voice print match means for receiving a user speech comprising a voice print phrase key upon detecting a state change from a doffed condition to a donned condition, wherein the user speech is compared to the authorized voice print phrase key to validate an identity of the headset user.

21. The headset of claim 20, wherein the detector means comprises a motion detecting means for detecting headset movement.

22. A headset user validation system comprising:
a headset comprising:
- a detector providing an output indicating a donned condition or a doffed condition;
- a microphone for receiving a user speech;
- a speaker; and
- a memory storing audio prompts for output through the speaker to prompt a user to speak a voice print phrase key;

an authenticator device comprising:
- a memory storing a pre-determined voice print phrase key of an authorized headset user;
- a processor; and
- a voice print match application for receiving the user speech corresponding to a submitted voice print phrase key, wherein the user speech is compared to the pre-determined voice print phrase key to validate an identity of the authorized headset user, wherein when the identity of the user is validated, functions of the headset requiring validation are unlocked for use by the headset user, otherwise the functions requiring validation are locked.

23. The headset of claim 22, wherein the detector comprises a motion detector.

24. The headset of claim 23, wherein the motion detector includes a magnet and a coil moving relative to one another.

25. The headset of claim 23, wherein the authenticator device is a cellular telephone.

26. The headset of claim 23, wherein the motion detector includes an acceleration sensor having a mass affixed to a piezoelectric crystal.

27. The headset of claim 23, wherein the motion detector includes a light source, a photosensor, and a movable surface therebetween.

28. A method for validating the identity of a headset wearer comprising:
- detecting kinetic energy, temperature or capacitance to determine a headset characteristic;
- processing the headset characteristic to determine a donned condition or a doffed condition;
- receiving a spoken user voice print phrase key upon detection of a change from a doffed condition to a donned condition;
- transmitting the spoken user voice print phrase key to a remote authentication device; and
- comparing the spoken user voice print phrase key to a stored authorized user voice print phrase key at the remote authentication device to validate an identity of a headset wearer, wherein when the identity of the user is validated, functions of the headset requiring validation are unlocked for use by the headset user, otherwise the functions requiring validation are locked.

29. The method of claim 28, further comprising determining whether a headset state has shifted from a doffed condition to a donned condition.

30. The method of claim 28, further comprising entering a validated state upon validation of the identity of the headset wearer.

31. The method of claim 28, further comprising terminating a validated state upon determination of a doffed condition.

32. The method of claim 28, further comprising receiving a spoken user name upon detection of a donned condition.

33. A method for validating the identity of a headset wearer comprising:
   detecting kinetic energy, temperature or capacitance to determine a headset characteristic;
   processing the headset characteristic to determine a donned or doffed condition;
   receiving a user speech comprising a password or personal identification number;
   transmitting the user speech to a remote authentication device;
   recognizing the password or personal identification number at the remote authentication device; and
   comparing the password or personal identification number to a stored authorized user password or personal identification number to validate an identity of a headset wearer to authorize a use of a headset, wherein when the identity of the user is validated, functions of the headset requiring validation are unlocked for use by the headset user, otherwise the functions requiring validation are locked.

34. The method of claim 33, further comprising receiving user speech comprising a user name.

35. A headset user validation system comprising:
   a headset comprising:
      a detector providing an output indicating a donned condition or a doffed condition;
      a speaker for outputting an audible prompt to prompt a user to submit user speech corresponding to a password or personal identification number;
      a microphone for receiving the user speech corresponding to the password or personal identification number; an authenticator device comprising:
      a memory storing a valid password or personal identification number of an authorized headset user;
      a processor; and
      a speech recognition application for receiving the user speech corresponding to a password or personal identification number, wherein a submitted password or personal identification number recognized from the user speech is compared to the valid password or personal identification number to validate an identity of the authorized headset user to authorize a use of the headset, wherein when the identity of the user is validated, functions of the headset requiring validation are unlocked for use by the headset user, otherwise the functions requiring validation are locked.

36. The headset of claim 35, wherein the authenticator device is a cellular telephone.

* * * * *